(12) United States Patent
Yasuda et al.

(10) Patent No.: US 6,221,455 B1
(45) Date of Patent: Apr. 24, 2001

(54) MULTI-LAYER OPTICAL DISC AND RECORDING/REPRODUCING APPARATUS

(75) Inventors: Koichi Yasuda; Kotaro Kurokawa, both of Kanagawa; Yuji Kuroda, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/257,476

(22) Filed: Feb. 25, 1999

(30) Foreign Application Priority Data

Dec. 6, 1997 (JP) ............................................. P09-361068

(51) Int. Cl.⁷ ....................................................... B32B 3/02
(52) U.S. Cl. ...................... 428/64.1; 428/64.4; 428/64.5; 428/64.6; 428/913; 430/270.13; 430/495.1; 430/945; 369/283; 369/288
(58) Field of Search .................................. 428/64.1, 64.2, 428/64.4, 64.5, 64.6, 913; 430/270.11, 270.12, 270.13, 270.14, 495.1, 945; 369/283, 288

(56) References Cited

U.S. PATENT DOCUMENTS

| | | | |
|---|---|---|---|
| 5,817,389 | * 10/1998 | Ono | 428/64.1 |
| 5,883,878 | * 3/1999 | Satoh | 369/275.1 |
| 6,033,752 | * 3/2000 | Suzuki | 428/64.1 |

* cited by examiner

*Primary Examiner*—Elizabeth Evans
(74) *Attorney, Agent, or Firm*—Sonnenschein, Nath & Rosenthal

(57) ABSTRACT

A multi-layered optical disc having superior recording/reproducing characteristics, in which the recording density in three-dimensional direction can be increased to increase the recording capacity, and its manufacturing method. A multi-layered optical disc 1 has a light reflecting layer 3, a second information recording layer 4, a transparent layer 5, a first information recording layer 6 and a light-transmitting layer 7 sequentially formed on a major surface 2a of its substrate 2. The laser light is illuminated from the light-transmitting layer 7 of the multi-layered optical disc 1 to record and/or reproduce information signals.

11 Claims, 12 Drawing Sheets

MULTI-LAYER OPTICAL DISC AND RECORDING/REPRODUCING APPARATUS

BACKGROUND OF THE INVENTION

1. Field of the Invention

This invention relates to a multi-layer optical disc having its recording portion made up of plural information recording layers, and a recording/reproducing apparatus.

2. Description of the Related Art

Recently, with the advent of the so-called multi-media in the optical recording mediums, there is an increasing demand for handling the large-capacity information, such as digital moving pictures, such that increasing necessity is felt to store the large-capacity information to random-access and record/reproduce the stored information.

Among these random-accessible recording mediums, there is such an optical recording medium of large capacity that can be taken out or removed from the recording/reproducing apparatus. This type of the optical recording medium has so far been used in large quantities in various fields of application.

Under this situation, there is proposed, as a next-generation optical recording medium, such an optical recording medium which is able to record/reproduce for four hours on its one surface in accordance with the NTSC (National Television System Committee) system.

With this optical recording medium, it is targeted to enable recording/reproduction for four hours, as a video disc recorder for household use, in order to provide the function as a new recording medium which takes the place of the currently dominating video tape recorder (VTR). Moreover, since the optical recording medium has the same shape and size as the digital audio disc having the musical data recorded thereon, the optical recording medium is likely to be accepted by the user accustomed to the digital audio disc.

Meanwhile, the above-mentioned optical recording medium tends to be demanded to handle a larger quantity of the information, such that a larger recording capacity than is available at the present time is a desideratum.

For example, in a recording medium adapted for recording/reproduction under the above-mentioned NTSC system, it is currently desired to design the recording medium in a disc shape to exploit the speed in accessing characteristic of the disc to provide a small-sized easy-to-handle recording medium of large recording capacity in which it is possible to provide the diversified functions such as instantaneous recording/reproduction, trick play or editing.

However, in order to provided these diversified functions, the recording medium is required to have a recording capacity not less than, for example, 8 GB. The optical recording medium, that is able to realize this large recording capacity, is lacking at present for the following reason.

In a replay-only DVD (digital versatile disc), currently proposed, only the recording capacity of 4.7 GB is available, with the wavelength $\lambda$ being 0.65 $\mu$m and the numerical aperture NA of the optical system being 0.6.

Therefore, in order to provide the recording capacity of not less than 8 GB with the signals format, such as the ECC (error correction code) or the modulation system, of the DVD system, the following relation (1)

$$4.7\times(0.65/0.60\times NA/\lambda)^2 \geq 8 \quad (1)$$

From this equation (1), it is necessary that $NA/\lambda \geq 1.20$, meaning that a shorter wavelength or a higher NA is required.

If the higher NA is achieved, it becomes necessary to reduce the thickness of a transparent substrate of the optical disc through which is transmitted the illuminated reproducing light. The reason is that, with increase in NA, the allowance for the aberration produced due to the angle by which the disc surface is deviated relative to the optical axis of the optical pickup, that is the so-called tilt angle, becomes smaller, the aberration ascribable to this tilt angle becoming the larger the thicker the thickness of the transparent substrate through which is transmitted the reproducing light.

For the similar reason, the fluctuations of the thickness of the transparent substrate, through which is transmitted the reproducing light, need to be reduced to a pre-set range.

As a transparent substrate of the optical recording medium, such a substrate produced on injection molding of plastics is predominantly used. However, this injection-molded substrate is difficult to produce within narrow tolerance to an extremely thin thickness.

On the other hand, the recording density in the in-plane direction, that is in a two-dimensional direction, of the information recording medium of a optical recording medium, depends on the minimum spot diameter of the laser light used, so that, the smaller the minimum spot diameter, the higher is the recording density that can be achieved in the signal recording. Therefore, in order to enable high recording density for the optical recording medium, attempts are currently made towards reducing the wavelength of the light source or increasing the numerical aperture NA of the objective lens. However, there is imposed a technical limitation on decreasing the wavelength of the laser light or increasing the numerical aperture NA of the objective lens, such that the recording density in the two-dimensional direction is, at it were, approaching its limit value.

As discussed in the foregoing, a higher recording capacity in an optical recording medium is becoming one of the targets in the technical investigations.

SUMMARY OF THE INVENTION

It is therefore an object of the present invention to provide a multi-layered optical disc having superior recording/reproducing characteristics and in which the recording density in a three-dimensional direction can be increased to give a higher recording density.

It is another object of the present invention to provide a manufacturing method for the optical recording medium.

In one aspect, the present invention provides a multi-layered optical disc in which a recording section is formed by layering two or more information recording layers via a transparent layer on a substrate having a thickness of 0.3 to 1.2 mm, and in which a light-transmitting layer having a thickness of 10 to 177 $\mu$m is formed on the recording section, with the light being illuminated from the side of the light-transmitting layer to record and/or reproduce information signals.

With the multi-layered optical disc of the present invention, at least one of the two or more information recording layers except the information recording layer remotest from the light-transmitting layer has a phase-change material as a recording material.

Preferably, the first information recording layer as counted from the light-transmitting layer has the phase-change material as a recording material.

In the above-defined multi-layered optical disc, since the information recording layers are of a multi-layered structure, the recording density is increased in the three-dimensional direction corresponding to the direction of thickness of the information recording layers, thus further increasing the recording capacity.

Moreover, with the multi-layered optical disc of the present invention, at least one of the two or more information recording layers remotest from the light-transmitting layer is a phase-change recording layer formed of a phase-change material. Therefore, the multi-layered optical disc according to the present invention can record/reproduce the information, while it is configured to have plural recordable/reproducible layers.

Also, with the multi-layered optical disc according to the present invention, the light is illuminated from the light-transmitting layer of a reduced thickness formed on the information recording layers, so that the disc can cope with higher NA of the objective lens to realize a higher recording capacity.

Also, the phase-change material has high light transmittance. Thus, by having the first information recording layer as counted from the light-transmitting layer formed of a phase-change material, in the multi-layered optical disc according to the present invention, it is possible to minimize attenuation of the light due to passage of the light through the first information recording layer. The result is that light of sufficient intensity falls on the information recording layers on which is incident the light transmitted through the first information recording layer, while the reflected light from the other information recording layers can be received with a sufficient intensity.

In another aspect, the present invention provides a recording/reproducing apparatus including light radiating means for radiating light to a multi-layered optical disc having two or more information recording layers, light condensing means for condensing the light radiated from the light radiating means on the multi-layered optical disc, and light receiving means for receiving the return light reflected from the multi-layered optical disc. The multi-layered optical disc is such a disc in which a recording section is formed by layering two or more information recording layers via a transparent layer on a substrate, and in which a light-transmitting layer is formed on the recording section.

With the recording/reproducing apparatus according to the present invention, the light condensing section is movable in a controlled state so that the light from the light radiating means is focussed on each of the information recording layers on the multi-layered optical disc, whereby the light from the light radiating means is caused to fall on the respective information recording layers to record and/or reproduce information signals independently.

In the above-defined recording/reproducing apparatus according to the present invention, in which the light condensing means is moved over plural stages along the optical axis so that the light is focussed on the respective information recording layers of the multi-layered optical disc, the respective information recording layers can be recorded/reproduced in optimum states.

DESCRIPTION OF THE PREFERRED EMBODIMENTS

Figure 1:
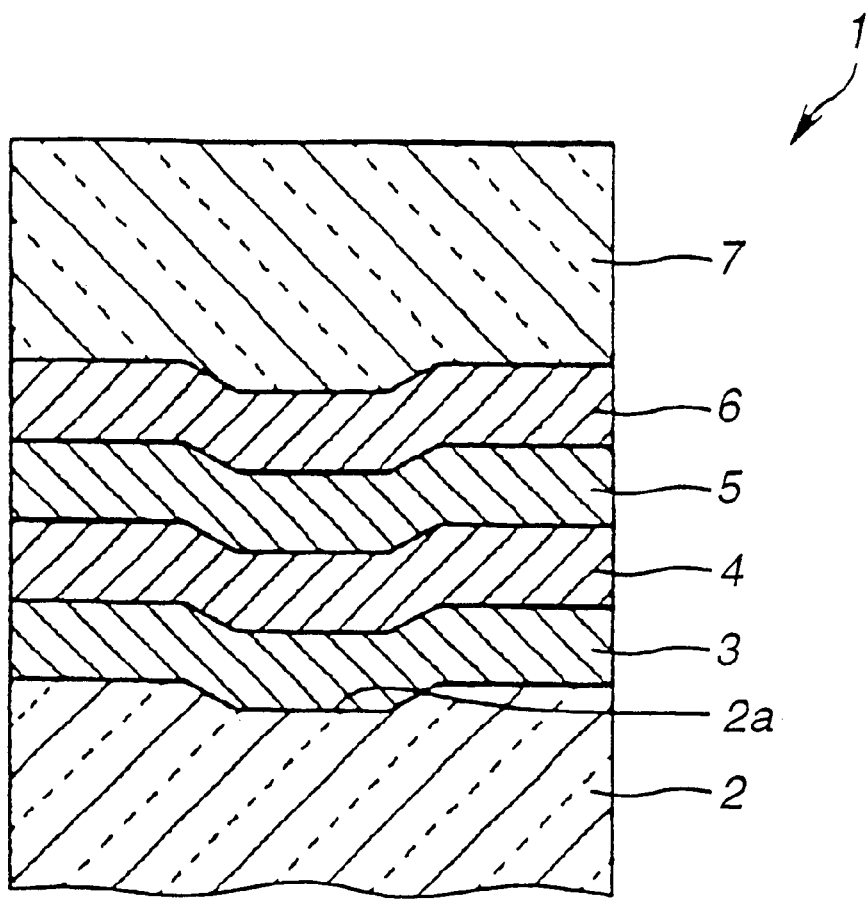
FIG. 1 is a cross-sectional view showing a typical multi-layered optical disc embodying the present invention.

Referring to the drawings, preferred embodiments of the present invention will be explained in detail.

The multi-layered optical disc according to the present invention includes a substrate, a recording section comprised of two or more information recording layers layered thereon via a transparent layer, and a light-transmitting layer formed on the recording section. With the multi-layered optical disc according to the present invention, the laser light falls on the light-transmitting layer side to record or reproduce information signals.

In particular, at least one of the two or more information recording layers other than the information recording layer remotest from the light-transmitting layer uses a phase-change material as a recording material. That is, in the multi-layered optical disc according to the present invention, at least one of the information recording layers other than the information recording layer closest to the substrate uses the phase-change material as a recording material. Of, course, in the multi-layered optical disc according to the present invention, the information recording layer remotest from the light-transmitting layer, that is the information recording layer closest to the substrate, may be used as a phase-change recording layer.

In the following, an optical disc having a recording section which is made up of two information recording layers is explained. Of course, the multi-layered optical disc according to the present invention is not limited to this particular type of the optical disc. FIG. 1 is a cross-sectional view showing a multi-layered optical disc according to the present invention.

A multi-layered optical disc 1 according to the present invention includes a light reflecting layer 3, a second information recording layer 4, a transparent layer 5, a first information recording layer 6 and a light-transmitting layer 7, sequentially formed on a major surface 2a of a substrate 2, as shown in FIG. 1. In this multi-layered optical disc 1, the laser light is illuminated from the light-transmitting layer 7 to record and/or reproduce information signals.

Specifically, if, when recording/reproducing information signals for the multi-layered optical disc 1 according to the present invention, the focussing point is set on the first information recording layer 6, which is the first layer as counted from the light-transmitting layer 7, the light focussing point is not set on the second information recording layer 4, so that information signals are recorded/reproduced only for the focussed first layer, namely the first information recording layer 6. Also, if the focussing point is set on the second layer, that is on the second information recording layer 4, the information signals are recorded/reproduced only for the focussed second layer, that is the second information recording layer 4.

In this multi-layered optical disc 1, since the information recording layers are of a multi-layered structure comprised of the first information recording layer 6 and the second information recording layer 4, and are designed to satisfy the standard, as now explained, the recording density is increased even in the three-dimensional direction corresponding to the direction of thickness of the information recording layers, in comparison with a conventional optical disc having a sole recording layer, thus realizing further increase in the recording capacity.

The structure of the multi-layered optical disc 1 according to the present invention is explained in detail.

In general, there is a certain correlation among the disc skew margin $\Theta$, wavelength $\lambda$, the numerical aperture NA of the objective lens and the thickness t of the light-transmitting layer. In particular, with an example of a compact disc CD, the validity or so-called playability of which is proven in practical application, the relation between these parameters and the disc skew margin $\Theta$ is disclosed in the Japanese Laying-Open Patent H3-225650 incorporated herein by reference for teachings in that regard.

By this prior-art publication, it suffices if $\Theta \leq \pm 84.115°$ $(\lambda/NA^3/t)$. This may be applied for the multi-layered optical disc 1 embodying the present invention.

The specified limit value of the skew margin $\Theta$ in case of actual mass production of optical discs is reasonably set to 0.4° since the production yield in mass production is lowered to raise the cost if the skew margin $\Theta$ is smaller than this value. In pre-existing optical discs, this value is 0.6° and 0.4°, respectively.

Thus, if, with $\Theta = 0.4°$, the desirable magnitude of the thickness t of the light-transmitting layer 7 in consideration of the tendency towards a shorter wavelength of the laser light and the higher numerical aperture NA is calculated, the numerical aperture NA equal to 0.78 or higher is needed from $NA/\lambda \geq 1.20$.

If the wavelength of the laser light is still shorter in future such that $\lambda = 0.4\ \mu m$, and the condition of $NA/\lambda \geq 1.20$ is kept unchanged, the thickness t of the light-transmitting layer is equal to 1.77 $\mu$m. Therefore, the maximum thickness of the light-transmitting layer 7 of approximately 177 $\mu$m is desirable. If a production equipment for producing the conventional CD with the substrate thickness of 1.2 magnetic material is used as it is, the thickness of the multi-layered optical disc 1 is 1.38 mm at the maximum.

On the other hand, the lower limit of the thickness t of the light-transmitting layer 7 is determined by whether or not the protective function for the information recording layers 4, 6, light reflective layer 3 or the transparent layer 5 is not lost. Specifically, the lower limit of the thickness is preferably 10 $\mu$m or more in consideration of the effect of possible collision of the double-lens set on the surface of the light-transmitting layer 7.

While there is the above-mentioned relation between the light-transmitting layer 7 and the skew margin $\Theta$, the thickness t of the light-transmitting layer 7 is desirably set to 10 to 177 $\mu$m in consideration that a range of laser light from the currently used red laser to the blue laser expected to be used in future is to be dealt with.

Therefore, the thickness t of the light-transmitting layer 7 is desirably 10 to 177 $\mu$m.

On the other hand, $NA/\lambda$ needs to be increased for improving the recording density, as discussed above.

For achieving the recording capacity of 8 GB, the numerical aperture NA of not less than 0.7 and the wavelength of the laser light of not more than 0.68 $\mu$m are needed. If the track pitch is P and the line density is d, the following relation:

$$(0.74/P) \times (0.267/d) \times 4.7 \geq 8 \tag{2}$$

needs to be met.

From this equation (2), it suffices if the line density d meets the following relation (3):

$$d \geq 0.1161/P\ \mu m/bit \tag{3}$$

If P=0.56 $\mu$m, d$\leq$0.206 $\mu$/bit. This is based on the ROM (read-only memory) of the DVD and, if specifically the application of PPML (Partial Response Maximum Likelihood) or the progress in the signal processing technique, such as reduction in ECC redundancy is taken into account, further increase of the line density of the order of 15% is expected, such that P can be increased correspondingly.

From this, the maximum value of the track pitch P of 0.64 $\mu$m is derived.

The tolerance value for the fluctuations $\Delta P$ of the track pitch P is also stringent. If the recording/reproducing parameters of the CD or the DVD are directly used, $\Delta P$ is given by:

$$\Delta P < \pm 0.03 P/0.74 = \pm 0.04 P \tag{4}$$

since track pitch of the DVD is 0.74 $\mu$m and the tolerance is $\pm 0.03$. Therefore, if P=0.56, $\Delta P \leq \pm 0.023\ \mu m$.

For the thickness fluctuations $\Delta t$ of the light-transmitting layer 7, further improvement in precision is needed. If the thickness t of the light-transmitting layer is deviated from the designing center value for the objective lens, the aberration which the thickness fluctuations $\Delta t$ of the light-transmitting layer 7 gives to the spot is proportionate to the fourth power of NA or to the wavelength of the laser light. Therefore, if the recording density is to be achieved by increasing the NA of the objective lens or shortening the wavelength, more strict limitations are imposed on the thickness fluctuations $\Delta t$ of the light-transmitting layer 7.

Specifically, NA=0.45 is set for a CD as an illustrative system, with the standard for the thickness fluctuations $\Delta t$ of the light-transmitting layer 7 being $\pm 100\ \mu m$. For the DVD, NA=0.6, with the standard for $\Delta t$ being $\pm 30\ \mu m$.

If the allowed value of $\pm 100\ \mu m$ for the CD is used as a reference, the thickness fluctuations $\Delta t$ of the light-transmitting layer 7 are given by:

$$\Delta t = \pm \leq 0.45/NA)^4 \times (\lambda/0.78) \times 100 = \pm 5.26 \times (\lambda/NA^4)\mu m \tag{5}$$

With the center of the thickness of 100 $\mu$m of the light-transmitting layer 7, the wavelength of the laser light of 0.68 $\mu$m, and with the numerical aperture NA of the objective lens of 0.875, an experiment was conducted on the relation between the thickness fluctuations Δt of the light-transmitting layer 7 and the jitter. The results are shown in FIG. 2.

Figure 2:
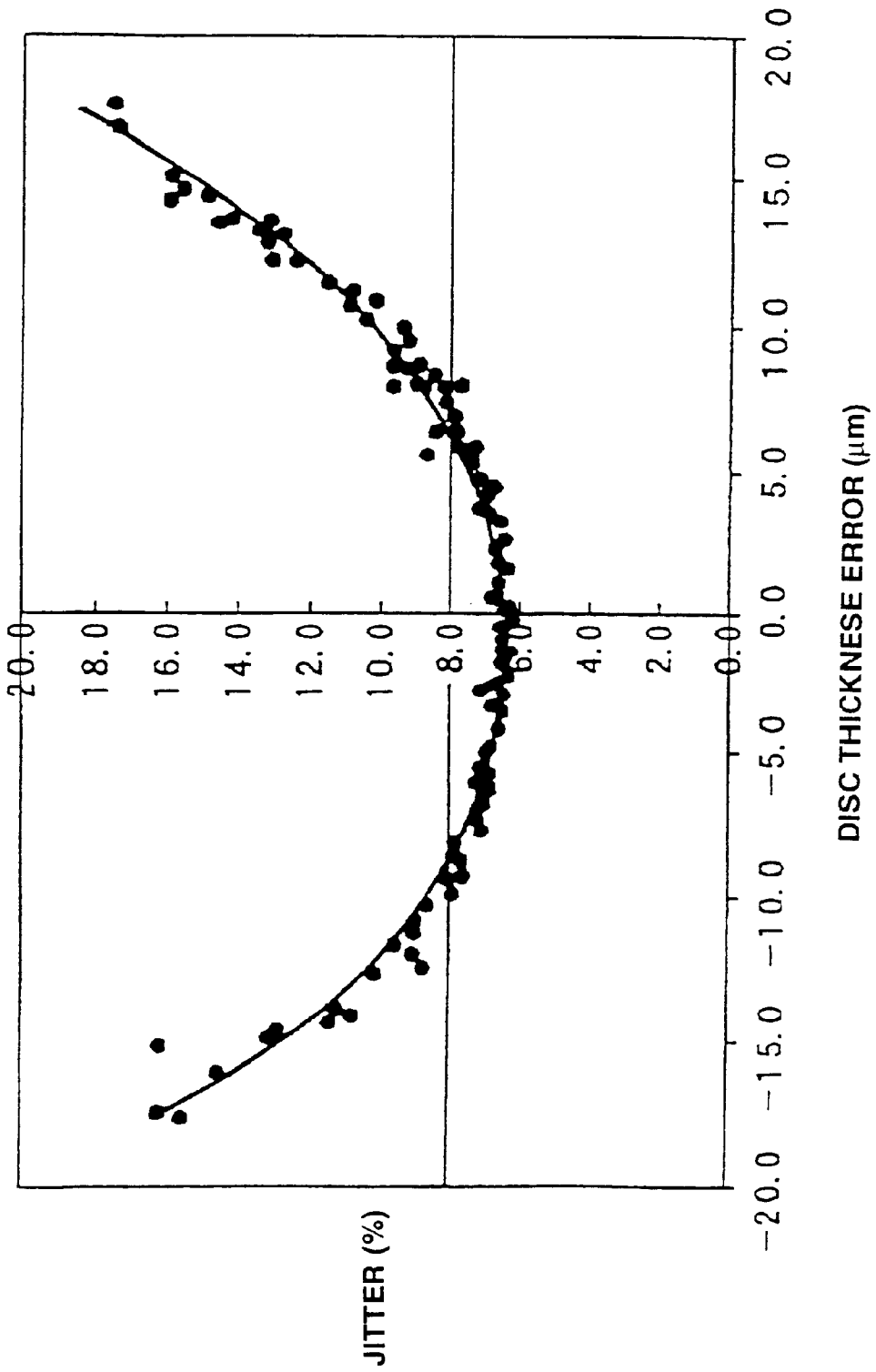
FIG. 2 shows the relation between disc thickness variations and jitter values.

If, in the results of FIG. 2, the jitter reference of 8% in case there prevails no precession, such as skew, is checked, the thickness fluctuations Δt of the light-transmitting layer 7 are approximately ±7 μm. It may be said that Δt derived from the above equation (5) is approximately ±7 μm, such that optimum signals can be obtained from the optical disc 1 satisfying this reference value.

Therefore, the thickness fluctuations Δt allowed to the thickness t of the light-transmitting layer 7 with increase in density need to be not larger than ±5.26×(λ/NA$^4$). The thickness fluctuations Δt of the light-transmitting layer 7 are presupposed to be uniform in the surface of the optical disc 1 illuminated by the recording/reproducing laser light. However, should there be thickness fluctuations in the light-transmitting layer 7 within this spot, the aberration cannot be corrected by adjusting the focussing point. Therefore, the surface roughness Ra of the optical disc 1 needs to be suppressed to ±3λ/100 or less with respect to the thickness center value.

As for eccentricity E, the following relation $$E \leq 50 \times P/0.74 = 67.57P[\mu m] \quad (6)$$

needs to be satisfied.

As discussed above, for realizing the large storage capacity of 8 GB, the following structure needs to be met:
recording/reproducing optical system: λ≦0.68 μm, NA/λ÷1.20 μm$^{-1}$
thickness t of the light-transmitting layer 7 in the recording area: 10 to 177 μm
thickness fluctuations Δt of the light-transmitting layer 7: Δt≦±5.26 (λ/NA$^4$)μm
track pitch P: P≦0.65 μm
tolerance ΔP: ΔP≦±0.04 P μm
line density d: d≦0.1161/P μm/bit
skew margin ⊖: ⊖≦84.115×(λ/NA$^3$/t)°
eccentricity E: E≦67.57 P μm
surface roughness Ra: Ra≦±3λ/100 (within the spot illuminating range).

The structure of each layer of the multi-layered optical disc 1 is hereinafter explained in detail.

The surface 2a of the substrate 2 is formed with minute lands and recesses, such as guide grooves or pre-grooves for recording signals, such as information signals. The substrate preferably has a thickness of 0.3 to 1.2 mm. The materials of the substrate may be enumerated by plastics, such as polycarbonate or acrylic resins, such as methyl methacrylate (PMMA), or glass. The substrate 2 is produced by injection molding and by the photopolymer (2P) method in the former and latter cases, respectively.

The light reflecting layer 3, formed on the major surface 2a of the substrate 2, operates as a reflecting layer for reflecting the light transmitted through the first and second information recording layers 4, 6, while also operating as a heat sink layer for preventing the heat to be confined excessively in the first and second information recording layers 4, 6.

The materials of the light reflecting layer 3 may be enumerated by metal elements, metalloid elements, semiconductor elements, and compounds thereof, either alone or in combination.

Most preferred is a material mainly composed of Al and containing 0.4 to 0.8 wt % of Si, not more than 0.7 wt % of Fe, 0.15 to 0.40 wt % of Cu, not more than 0.15 wt % of Mn, 0.8 to 1.2 wt % of mg, 0.04 to 0.35 wt % of Cr, not more than 0.25 wt % of Zn and not more than 0.15 wt % of Ti. The light reflecting layer 3 is formed as a thin film having a thickness of 50 to 200 nm.

The reason is that, if a phase-change recording layer, formed of a phase-change material, is layered as the information recording layer 4 on the light reflecting layer 3, this phase-change recording layer is affected to a lesser extent by crystallinity of the light reflecting layer 3 or the shape of the interface defined by the grain size of the material of the light reflecting layer 3, as a result of which the phase-change recording layer correctly reflects the surface shape of the substrate 2.

For forming the light reflecting layer 3 on the substrate 2 by the above-mentioned materials, an ion beam sputtering method or a dc sputtering method is preferably employed. Of these, the ion beam sputtering method is most preferred.

Also, in the multi-layered optical disc embodying the present invention, a recording section comprised of two or more information recording layers is formed on the light reflecting layer 3 formed on the substrate 2. In the multi-layered optical disc embodying the present invention, at least one of the plural information recording layers other than the information recording layer remotest from the light-transmitting layer represents the phase-change recording layer constituted from the phase-change material as a recording material.

In particular, in the present multi-layered optical disc, the first information recording layer 6 as the first layer as counted from the light-transmitting layer is preferably the phase-change recording layer. The reason is that the phase-change material in general has a higher light transmittance, so that, if this phase-change material is used for the first information recording layer 6 as the first layer as counted form the light-transmitting layer 7 illuminated by the light, light attenuation otherwise caused by light transmission through the first information recording layer 6 can be suppressed to a smaller value. The result is that the light of sufficient light intensity falls on the second and the following information recording layers as counted from the light-transmitting layer 7 while the reflected light of sufficient intensity is received from the second and the following information recording layers.

In the multi-layered optical disc of the present invention, the second information recording layer 4 and the first information recording layer 6 are layered via the transparent layer 5 on the light reflecting layer 3 formed on the substrate 2, as shown in FIG. 1.

With the multi-layered optical disc 1 of the present invention, the number of information recording layers may be two or more, instead of two, as discussed above.

In addition, all of the information recording layers need not be phase-change recording layers since it suffices if at least only one of the information recording layers other than the information recording layer remotest from the light-transmitting layer is the phase-change recording layer. The other information recording layer may be a photomagnetic recording layer which loses coercivity by temperature increase in excess of the Curie temperature to undergo inversion of the direction of magnetization to the direction of the external magnetic field, or a replay-only recording section comprised of a metal reflective film formed on lands and pits on the substrate. As the photomagnetic recording layer, a perpendicular magnetic recording film exhibiting Kerr effect or the Faraday effect, such as a thin amorphous alloy film, e.g., a Th—Fe—Co film, may be used as the photomagnetic recording layer.

It should be noted that the first information recording layer 6 and the second information recording layer 4 are phase-change recording layers constituted by a phase-change material as the recording material. If the multi-layered optical disc is the two-layered disc, as described above, it suffices if the first information recording layer 6 is the phase-change recording layer, it being unnecessary for the second information recording layer 4 to be the phase-change recording layer.

As the phase-change material used for the recording material, such a material which undergoes phase change between the crystal and amorphous states is used. With this type of the phase-change recording layer, the recording pits are formed in the following manner:

That is, the phase-change recording layer presents an amorphous state, in the as-formed state, if it is formed by a sputtering method. The phase-change recording layer in the amorphous state is phase-changed to the crystal state by raising its temperature to higher than the crystallization temperature (initialization). If, in this state, the laser light is illuminated from the side of the light-transmitting layer 7, the laser light converging area undergoes phase change from the crystal state to the amorphous state to cause changes in reflectance. The portion of the layer thus changed in reflectance serves as the recording pit. This recording pit can be detected by exploiting the difference in reflectance between the pitted portion and the non-pitted portion.

In selecting this type of the phase-change material, the following points are desirably taken into consideration:

First, such a material should be selected which is less susceptible to changes in the composition, such as phase separation, or segregation, and in which the number of sorts of the crystals formed is small. Also, such a material is preferably selected which has the melting point, crystallization temperature or the crystallization speed in optimum ranges.

Specifically, the melting point of the phase-change material is desirably not higher than 700° C. For causing the phase change of the film of the phase-change material to an amorphous state, this film needs to be raised in temperature to higher than the melting point. Therefore, if the melting point of the phase-change material is too high, the light-transmitting layer 7, transparent layer 5 or the substrate 2, provided next or adjacent to the phase-change recording layer, is put under a thermal load due to heating of the phase-change material to such elevated temperature.

The crystallization temperature is preferably not lower than 150° C. Should the crystallization temperature of the phase-change material is too low, the recording pits are poor in thermal stability to lower the information keeping reliability.

Also, the crystallization speed of the phase-change material is desirably not higher than 500 nsec. The linear velocity of the optical disc is 2 to 20 m/sec, with the spot diameter of the laser light on the disc surface being of the order of 1 $\mu$m. Therefore, the laser light illuminating time on a certain point on the phase-change recording layer is 50 to 500 nsec. In order for the phase change to occur in so short illuminating time, the crystallization speed of the phase-change material needs to be not shorter than 500 nsec.

Preferred examples of the phase-change materials include at least one of Au, Al, Ag, Bi, Cu, Cr, Co, Cd, Ce, Cs, Dy, Fe, Ge, Gd, Ga, Hf, In, K, La, Li, Mn, Mo, Ni, Nb, Nd, Na, Os, Pd, Pr, Pb, Ru, Rh, Rb, Sn, Sb, Si, Sm, Sc, Se, Te, Ti, Tb, Ta, Ti, V, W, Y, Zn and Zr. These materials maybe enumerated by InSe-based chalcogenides, SbSe-based chalcogenides, InSbSe-based chalcogenides, GeSbTe-based chalcogenides, GeSbTeSe-based chalcogenides, GeSbTeN-based chalcogenides, AgInSbTe-based chalcogenides, AgInSbSeTe-based chalcogenides and AgInSbTeN-based chalcogenides. In particular, use of the above-mentioned chalcogenides as the phase-change material in the second information recording layer 6 corresponding to the first layer as counted from the light-transmitting layer 7 is desirable with respect to optical conditions, such as light transmittance or reflectance.

Examples of the preferred materials include $Sb_2Se_3$ and $Ge_2Sb_2Te_5$ (melting point, 600° C.; crystallization speed, 50 nsec) and $TeO_x$, where $0<X<2$. Of these, $TeO_x$ is relatively stable in the crystalline state and is favorable in securing thermal stability of the recording pit. The above-mentioned Se-based chalcogenides admixed with Si are also desirable since it has a faster crystallization speed.

If, in the multi-layered optical disc, the above phase-change materials are used as the recording material for the information recording layer, it is critical to consider the optical properties of the information recording layers and the position of the information recording layers in the recording section.

In the multi-layered optical disc, the second information recording layer as counted from the light-transmitting layer on the laser light incident side and the nth information recording layer removed by two or more layers from the light-transmitting layer are irradiated with the laser light transmitted through the (n−1) information recording layers lying closer to the light-transmitting layer. The reflected light from the nth information recording layer is transmitted through the (n−1) information recording layers to fall on a light receiving section.

Therefore, the intensity of the laser light illuminated on a given information recording layer or the intensity of the received reflected light from the information recording layer is affected by the optical properties of the information recording layers lying closer to the light-transmitting layer than the information recording layer. It is therefore necessary for the information recording layers lying closer to the light-transmitting layer to exhibit sufficient reflectance to give a sufficient playback signal amplitude as well as to exhibit a high light transmittance.

In particular, the conditions for the first information recording layer as counted from the light-transmitting layer are strict in that it is required to have sufficient reproducible reflectance and high light transmittance.

On the other hand, it is critical that the information recording layers lying remoter from the light-transmitting layer can form recording pits even with the light of lower intensity, and that these information recording layers exhibit high reflectance and high absorbency to enable a sufficiently high playback signal amplitude from the recording pit. These need to be taken into account in designing the structure of the recording section.

Thus, in the multi-layered optical disc 1, the first information recording layer which is the first layer as counted from the light-transmitting layer 7 is required to have reflectance sufficient for reproduction and a high light transmittance.

Also, in the multi-layered optical disc 1, the second information recording layer 4, lying remote from the light-transmitting layer 7, needs to have high reflectance and high light absorbency in order to enable recording/reproduction even with the light of lower intensity.

Taking an example of the multi-layered optical disc 1, the recording section of which is constituted by two phase-change recording layers formed of a phase-change material, it is desirable that the following conditions:

$Rc_1 \geq 10\%$ $Rc_1/Ra_1 \geq 1.5$ $Tc_1, Ta_1 \geq 20\%$ be met in the first information recording layer 6 as the first recording layer as counted from the light-transmitting layer 7, where $Rc_1$, $Tc_1$, $Ra_1$ and $Ta_1$ denote the reflectance in the crystalline state with respect to the recording/reproducing light, light transmittance in the crystalline state with respect to the recording/reproducing light, reflectance in the amorphous state with respect to the recording/reproducing light and light transmittance in the amorphous state with respect to the recording/reproducing light, respectively.

It is also desirable that the following conditions:

$Rc_2 \geq 20\%$ $Rc_2/Ra_2 > 1.5$ $Tc_2, Ta_2 \geq 60\%$ be met in the second information recording layer 4 as the second recording layer as counted from the light-transmitting layer 7, where $Rc_2$, $Tc_2$, $Ra_2$ and $Ta_2$ denote the reflectance in the crystalline state with respect to the recording/reproducing light, light transmittance in the crystalline state with respect to the recording/reproducing light, reflectance in the amorphous state with respect to the recording/reproducing light and light transmittance in the amorphous state with respect to the recording/reproducing light, respectively.

In the first information recording layer 6, which is the first recording layer as counted from the light-transmitting layer 7, the reflectance $Rc_1$ in the crystalline state and the reflectance $Ra_1$ in the amorphous state are set from the viewpoint of the amplitude of the playback signals. If $Rc_1$, $Ra_1$ are off the above ranges, the playback signal amplitude obtained from the first information recording layer 6 falls short.

Also, in the first information recording layer 6, the light transmittance $Tc_1$ in the crystalline state and the reflectance $Ra_1$ in the amorphous state are determined from the viewpoint of suppressing attenuation of the laser light caused by transmission through the first information recording layer 6. If $Tc_1$ and $Ta_1$ are outside the above ranges, the laser light is attenuated in intensity by being transmitted through the first information recording layer 6, so that the laser light cannot be illuminated with sufficient strength on the second information recording layer 4 which is the second recording layer as counted from the light-transmitting layer 7. Also, the reflected light from the second information recording layer 4 cannot be received with sufficient intensity. Thus, it becomes difficult for the second information recording layer 4 as the second layer to form or detect the recording pits.

In the second information recording layer 4, which is the second recording layer as counted from the light-transmitting layer 7, the light absorbency $Ac_2$ in the crystalline state and the light absorbency $Aa_2$ in the amorphous state are set to enable phase change to occur even with a lower laser light intensity. If $Ac_2$ and $Ar_2$ are outside the above ranges, it becomes difficult to form recording pits.

Also, in the second information recording layer 4, which is the second recording layer, the reflectance $Rc_2$ in the crystalline state and the reflectance $Ra_2$ in the amorphous state are set in view of the playback signal amplitude. If $Rc_2$, $Ra_2$ are outside the above range, the playback signal amplitude obtained from the second information recording layer 4 as the second recording layer falls short.

These optical characteristics of the recording layer depend on the layer structure of the recording layers, that is the possible presence of the dielectric layer or the reflective layer, the refractive index n of the phase-change material used as a recording material, or the extinction coefficient k.

If the first information recording layer 6 and the second information recording layer 4 are constructed by the double-layered phase-change recording layer structure shown in table 1, the recording layer having the above-described optical properties can be realized by using the phase-change material the optical constants of which with respect to the recording/reproducing light satisfies the relation recited hereinbelow. Meanwhile, the structure shown in table 1 indicates a thermally optimum structure. Also, the structure shown in Table 1 represents a thermally optimum structure. The optical constants are found in accordance with a multi-layered film matrix calculation method, setting the condition possible leading to the optical properties required for the information recording layers.

TABLE 1 first information recording layer from the light-transmitting layer (first information recording layer 6)
structure: dielectric protective film/film of phase-change material/dielectric protective film
(ZnS—SiO$_2$)   (ZnS—SiO$_2$)
film thickness: 100 to 200 nm   10 to 30 nm   100 to 200 nm
optical properties: $Rc_1 \geq 10\%$, $Tc_1$, $Ta_1 \geq 40\%$
second information recording layer from the light-transmitting layer (second information recording layer 4)
structure: dielectric protective film/film of phase-change material/dielectric protective film/light reflecting layer
(ZnS—SiO$_2$)   (ZnS—SiO$_2$)
film thickness: 100 to 200 nm   10 to 30 nm   100 to 200 nm   150 nm
optical properties: $Rc_2 \geq 10\%$, $Ac_2$, $Aa_2 \geq 60\%$ phase-change material of the first information recording layer 6 as the first recording layer as counted from the light-transmitting layer:

$1/5(nc_1/na_1)+(kc_1/ka_1) \leq 10$ or $(nc_1/na_1)+1/5(kc_1/ka_2) \leq 10$ $nc_1$: refractive index in the crystalline state of the phase-change material $na_1$: refractive index in the amorphous state of the phase-change material $kc_1$: extinction coefficient in the crystalline state of the phase-change material $ka_1$: extinction coefficient in the amorphous state of the phase-change material phase-change material of the second information recording layer 4 as the second recording layer as counted from the light-transmitting layer:

$(nc_2/na_2)+(kc_2/ka_2) \leq 4$ $nc_2$: refractive index in the crystalline state of the phase-change material $na_2$: refractive index in the amorphous state of the phase-change material $kc_2$: extinction coefficient in the crystalline state of the phase-change material $ka_2$: extinction coefficient in the amorphous state of the phase-change material As for the ranges of the numerical values, a phase-change material satisfying the conditions of $nc_1 \leq 8.0$, $kc_1 \leq 5.0$, $na_1 \leq 7.0$ and $ka_1 \leq 4.0$ is desirable for the first information recording layer 6 as the first recording layer as counted from the light-transmitting layer 7. Also, a phase-change material satisfying the conditions of $1.0 \leq nc_2 \leq 8.0$, $1.0 \leq kc_2 \leq 7.0$, $1.0 \leq na_2 \leq 7.0$ and $ka_1 \leq 5.0$ is desirable for the second information recording layer 4 as the first recording layer as counted from the light-transmitting layer 7.

Figure 3:
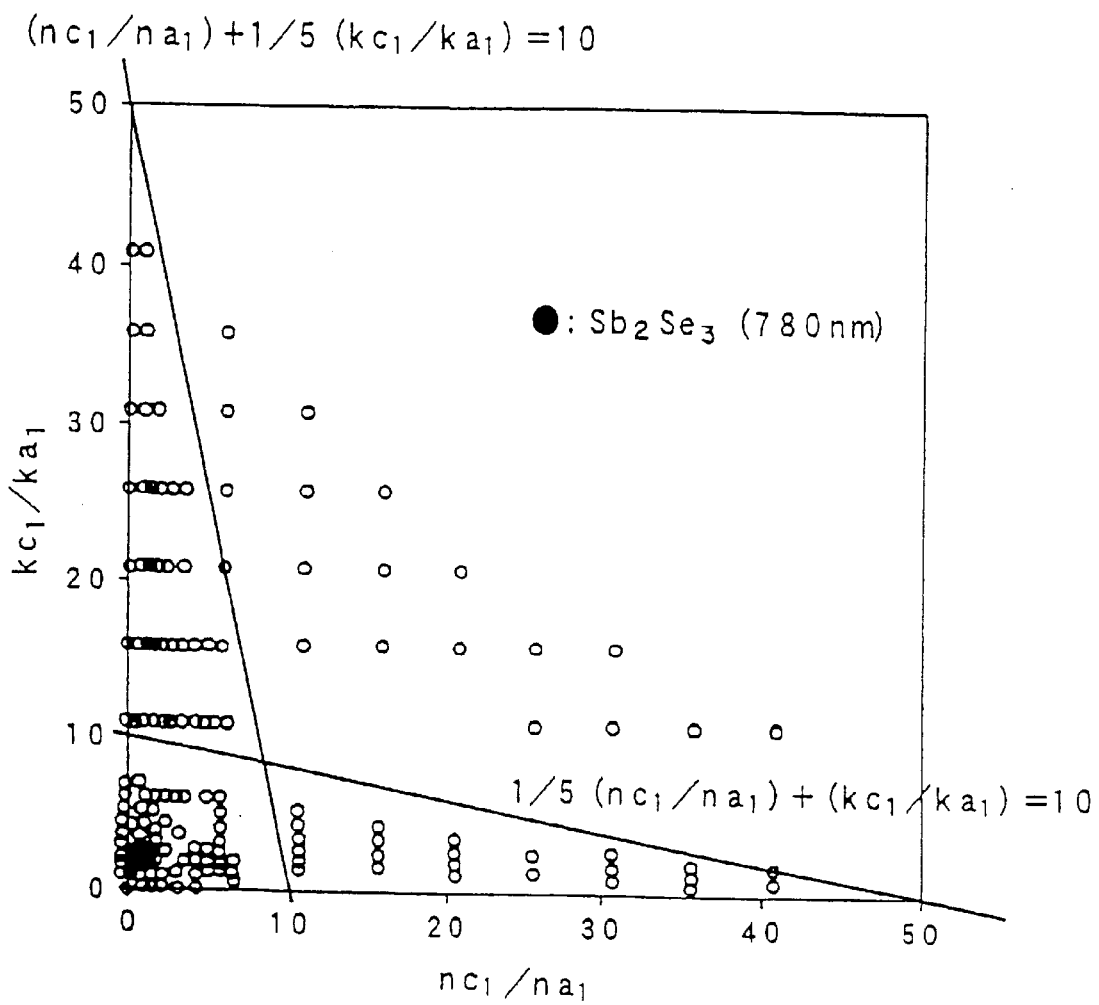
FIG. 3 shows the properties of a phase change material used in a first information recording layer.
Figure 4:
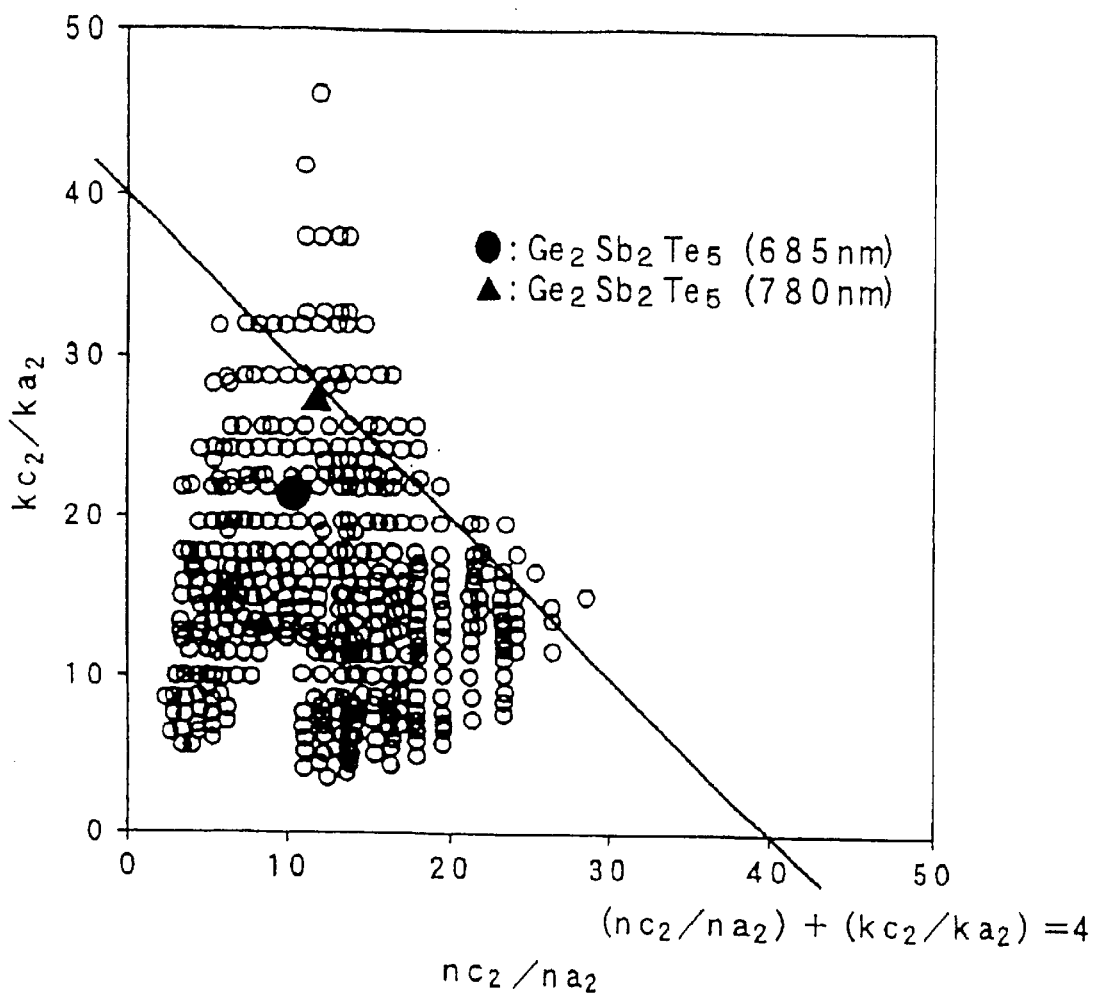
FIG. 4 shows the properties of a phase change material used in a second information recording layer.

FIG. 3 shows a graph showing $nc_1$, $na_1$, $kc_1$ and $ka_1$ of a variety of phase-change materials, in which the abscissa and the ordinate stand for $nc_1/na_1$ and $kc_1/ka_1$, respectively, while FIG. 4 shows a graph showing $nc_2$, $na_2$, $kc_2$ and $ka_2$ of a variety of phase-change materials, in which the abscissa and the ordinate stand for $nc_2/na_2$ and $kc_2/ka_2$, respectively.

Since the optical and thermal properties of the information recording layers 4, 6 are affected by the layered structures, dielectric protective films or metal reflective films may be used in conjunction to control these properties of the recording layer.

Figure 5:
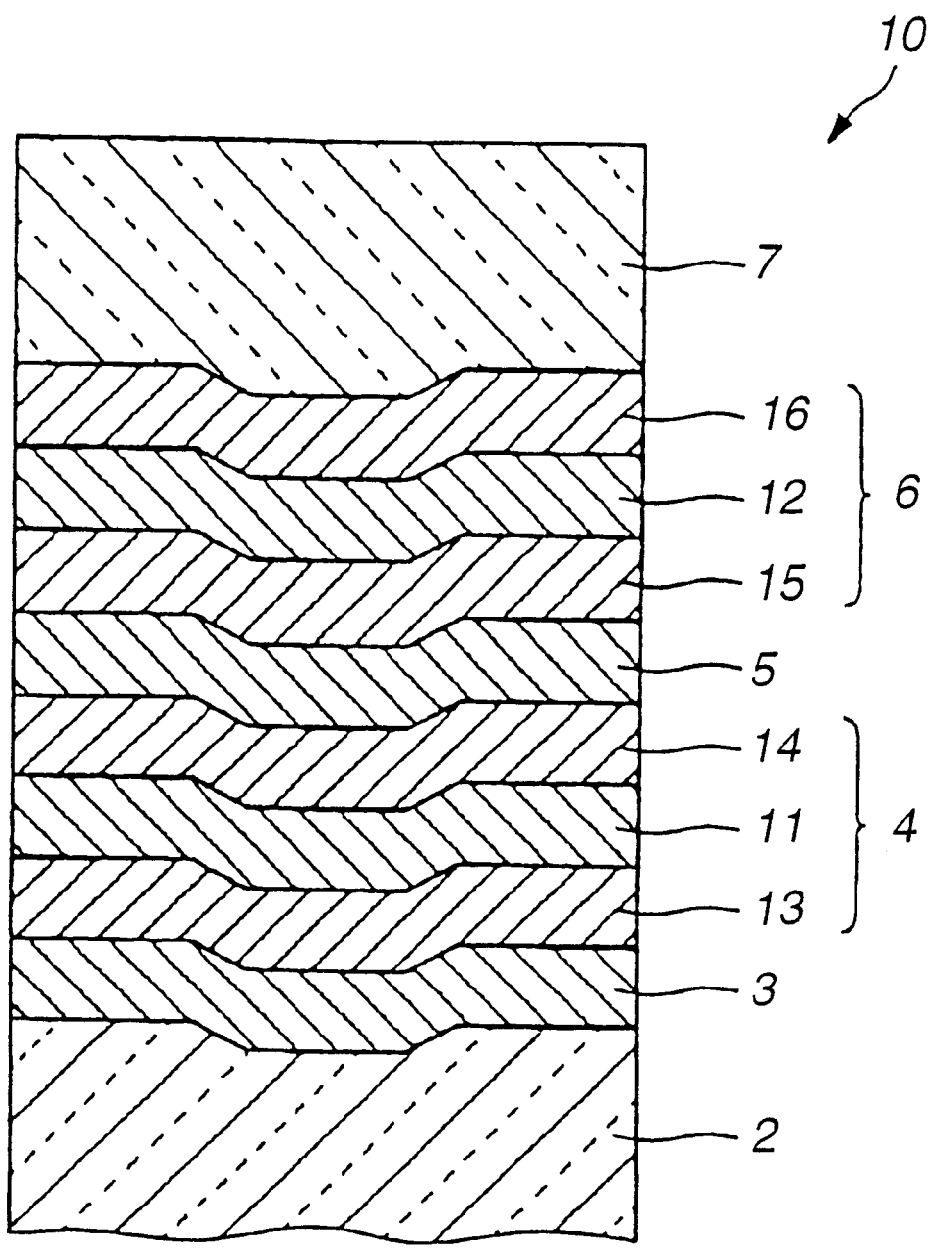
FIG. 5 is a cross-sectional view showing another typical multi-layered optical disc embodying the present invention.

Referring to FIG. 5, such a multi-layered optical disc 10 may be used which is comprised of two information recording layers 4, 6, of which the first information recording layer 6 as the first recording layer as counted from the light-transmitting layer 7 is made up of a first dielectric protective film 15, a film of a phase-change material 12 and a second dielectric protective film 16 and the second information recording layer 4 as the second recording layer as counted from the light-transmitting layer 7 is made up of a first dielectric protective film 13, a film of a phase-change material 11 and a second dielectric protective film 14.

In such multi-layered optical disc 10, the dielectric protective films 14, 16 towards the light-transmitting layer 7 (referred to hereinafter as second dielectric protective films) affect the optical properties of the information recording layers, such as reflectance, light absorbency or light transmittance, due to optical interference effects.

The dielectric materials in general is less susceptible to thermal diffusion and hence the dielectric protective films on the opposite side of the light-transmitting layer 7, referred to hereinafter as first dielectric protective films 13, 15, affect the cooling speed of the film of the phase-change material. The thicker the film thickness of the first dielectric protective films 13, 15, the more easily the heat is accumulated in the film of the phase-change material, thus retarding the cooling rate (gradual cooling structure).

In this case, heat is accumulated in the films of the phase-change material 11, 12 to fluidize the films of the phase-change material, even although the sensitivity to the laser light is improved.

For suppressing such heat accumulation, it is advisable to use the metal reflecting films or a third dielectric protective film in conjunction.

That is, on the second information recording layer 4, which is a recording layer remotest from the light-transmitting layer 7, the light reflecting layer 3 comprised of a metal reflecting film is formed between the layer 4 and the substrate 2. If, in the second information recording layer 4 formed on the substrate 2 via the light reflecting layer 3, the first dielectric protective film 13 is reduced in thickness, the heat in the film of the phase-change material is more liable to be diffused via the first dielectric protective film 13 to the light reflecting layer 3, thus raising the cooling rate (rapid cooling structure). A third dielectric protective film having a larger thermal conductivity may be provided between the first dielectric protective film 13 and the light reflecting layer 3.

In the information recording layer other than the recording layer remotest from the light-transmitting layer 7, such as the first information recording layer 6, a third dielectric protective film, not shown, may be provided between the transparent layer 5 and the first dielectric protective film 15. If the third dielectric protective film of a larger conductivity is used as this third dielectric protective film, heat diffusion may be promoted to prevent the heat from being accumulated in the film of the phase-change material.

Of course, if the first dielectric protective films 13, 15 and/or the second dielectric protective films 14, 16 of higher thermal conductivity are used without providing the third dielectric protective film between the first dielectric protective film 13 and the light reflecting layer 3 or between the transparent layer 5 and the first dielectric protective film 15, heat accumulation may be prohibited effectively.

As the material for the dielectric protective film, those exhibiting only limited absorption in the laser light wavelength range may be used, such as nitrides, oxides or sulfides of metals, such a Al, or semiconductor elements, such as Si. If expectations are made of the heat diffusion effects of this material, such a material having higher thermal conductivity, such as $Al_3O_4$ or SiC, is preferably employed.

With the multi-layered optical discs 1 or 10, embodying the present invention, made up of plural recording layers, of which at least one is a phase-change recording layer, the recording density can be increased even in the direction of film thickness, that is in the three-dimensional direction, thus further increasing the recording capacity.

The thermal characteristics of the information recording layers is affected significantly by the film thickness of the film of the phase-change material itself If the film thickness of the phase-change material is too thick, the thermal capacity is increased thus displaying the tendency to re crystallization. In this case, the film of the phase-change material tends to be fluidized by the heat accumulation effects to deteriorate te overwrite characteristics (durability) even although the erasure ratio is improved. On the other hand, if the film thickness of the phase-change material is too thin, the film itself is deteriorated significantly.

The layered structure of the information recording layers is optimized in consideration of the possible effects on the optical or thermal properties as described above.

In the case of the multi-layered optical disc 10, shown in FIG. 5, the film thicknesses of the respective layers are preferably in the following ranges: film thickness structure of the first recording layer from the light-transmitting layer (first information recording layer 6)

film thickness of the first dielectric protective film 15: 100 nm to 200 nm film thickness of the film of the phase-change material 12: 10 nm to 30 nm film thickness of the second dielectric protective film 16: 100 nm to 200 nm film thickness structure of the second recording layer from the light-transmitting layer (second information recording layer 4)

film thickness of the first dielectric protective film 13: 10 to 30 nm film thickness of the film of the phase-change material 11: 10 to 30 nm film thickness of the second dielectric protective film 14: 80 nm to 200 nm Thus, the multi-layered optical disc 1 of the present invention includes at least one information recording layer having the phase-change material as the recording material. The information recording layers, having the phase-change material as the recording material, permits recording of information signals for write-once or overwrite operations by the user.

If the disc is used as an overwrite disc, the film of the phase-change material in the as-formed state in its entirety is phase-changed to the crystalline state by way of initialization. The film in the crystallized state is locally phase-changed to the amorphous state to form recording pits.

In particular, if the information recording layers are constructed as the above-described at least two phase-change recording layers, the optical disc is a RAM—RAM optical disc thus realizing an increased recording capacity and improved ease in handling by the user.

If the disc is to be used as a once-write disc, recording pits may be formed after initialization as described above. Alternatively, the recording pits may also be formed by locally phase-changing the film in the amorphous state. In this case, the labor for initialization may be saved.

In the multi-layered optical disc according to the present invention, it is unnecessary for the multi-layered optical disc to be of a dual-layer structure, it being sufficient if the disc has a multi-layered structure having two or more recording layers.

Moreover, in the multi-layered optical disc according to the present invention, it suffices if at least one layer other than the information recording layers lying at the remotest position from the light-transmitting layer is the above-mentioned phase-change recording layer, while it is unnecessary for the two layers to be the phase-change recording layers as shown in FIGS. 1 and 5. As the other layers, it is sufficient if the information recording layers as shown below are formed depending on the usage of the information recording layers.

If, as the other information recording layers, the write-one or overwrite information recording layers are used, photo-magnetic recording materials, such as rare earth element-transition metal alloy amorphous thin films or organic dye materials, are used as the recording material.

If the read-only information recording layers are formed as the other recording layers, the recording layers are formed by forming a metal reflective film on the substrate 2 or the transparent layer 5 on which patterns of lands and grooves are formed in meeting with the information signals.

If the read-only information recording layers are formed closest to the substrate 2, there are formed patterns of lands and grooves in meeting with the information signals on the substrate 2, and the read-only information recording layers are formed by metal reflective films coating these patterns.

If the read-only information recording layers are formed as the other information recording layers without being formed on the substrate 2, there are formed patterns of lands and grooves in meeting with the information signals in the transparent layer 5 and the read-only information recording layers are formed by the metal reflective layer coating these patterns.

The transparent layer 5 formed on the second information recording layer 4 performs the role of optically separating the information recording layers 4 and 6 from each other. Therefore, the transparent layer 5 needs to be of a certain thickness, specifically a thickness of not less than 30 $\mu$m. If the transparent layer is too thin, the reflected light from the first information recording layer 6 cannot be sufficiently separated from the reflected light from the second information recording layer 4, such that correct separation is not possible. If the transparent layer is too thick, spherical aberration tends to be produced. The transparent layer needs to be set to an optimum thickness taking these factors into account.

In the transparent layer 5, guide grooves etc are formed as lands and grooves if the recording layer formed thereon is a write-once or overwrite recording layer. If the recording layer is a read-only layer, the information signals are formed as lands and grooves along with the guide grooves.

On the light-transmitting layer 7 formed on the first information recording layer 6, the laser light is incident at the time of reproduction of information signals. This light-transmitting layer 7 operates not only for protecting the light reflecting layer 3, first information recording layer 6 or the second information recording layer 4 from an external impact, but also for preventing these layers 3, 4 or 6 from contacting with corrosive factors, such as moisture.

This light-transmitting layer 7 is constructed by a material transmitting the laser light. For example, the light-transmitting layer 7 is formed by coating a UV curable resin by, for example, spin coating, on the first information recording layer 6, and illuminating UV light thereon. Meanwhile, the light-transmitting layer 7 may be formed by bonding a sheet of a resin material, such as acrylic resin or polyolefinic resin, or a transparent plate, such as glass sheet, on the first information recording layer 6 by a transparent adhesive, such as UV curable resin.

The thickness of the light-transmitting layer 7 is limited to 3 to 177 $\mu$m, as described above, since the coma aberration produced by disc tilt can be suppressed to a smaller value even if the numerical aperture NA of the objective lens of the recording/reproducing optical system is increased significantly. This enables the multi-layered optical discs 1, 10 to cope with the high NA sufficiently to realize a larger capacity.

Meanwhile, the light-transmitting layer 7 is formed to cover the recording layer lying on the outermost layer from the substrate, not only if the optical disc has the double-layer structure as shown in FIGS. 1 and 2 but also if the optical disc has three or more recording layers.

The method for producing the multi-layered optical disc 10 according to the present invention is hereinafter explained.

For producing the multi-layered optical disc 10 embodying the present invention, the substrate 2 is first formed, in accordance with the injection molding method, using a stamper with the pitch and pitch fluctuations satisfying the specifications for the optical disc.

Meanwhile, the stamper with high accuracy with only negligible pitch fluctuations is produced by a master light exposure device having a feed unit employing a linear motor. The stamper is produced by covering the optical system of the master light exposure device with a shield for protecting the optical system from air oscillations or by providing an anti-oscillation member between the laser and the master light exposure device for removing vibrations of the cooling water of the light exposure laser.

In the multi-layered optical discs 1, 10 according to the present invention, a guide groove 2a is formed in the substrate 2, and a light reflecting layer 3, a second information recording layer 4, formed of a phase-change material, a transparent layer 5, a first information recording layer 6, formed of the phase-change material, and a light-transmitting layer 7, are sequentially formed over the guide groove 2a. In this multi-layered optical discs 1, 10, since the recording/reproduction is from the light-transmitting layer 7, it is necessary to form the groove in the substrate 2 taking into account the deformation of the signal shape by film forming from the outset.

In general, if, in a ROM having the recording capacity of 10 GB, the asymmetry of the signal pits looking from the supporting substrate 201 opposite to the light incident side is 25%, the asymmetry looking from the opposite side to the supporting substrate 201 is 10%. Thus, since the signals are read in the optical discs 1, 10 from the light-transmitting layer 7 on the opposite side to the substrate 2, the pit shape on the substrate 2 needs to be set to the asymmetry 25% in order to form pits with the asymmetry 10% looking from the light-transmitting layer 7.

Figure 6:
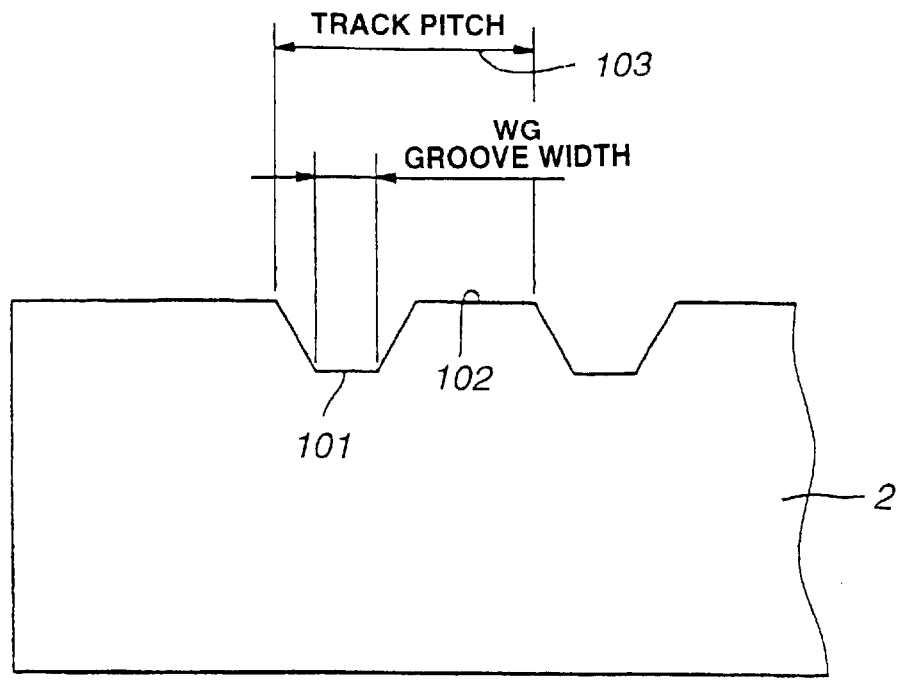
FIG. 6 is a cross-sectional view showing a groove and a land of a substrate.

With the multi-layered optical discs 1, 10 according to the present invention, the portion exposed to the laser light during mastering, that is the recessed portion looking from the light-transmitting layer 7 in FIG. 6, is termed a groove 101, as shown in FIG. 6 showing the guide groove structure of the recording type optical disc. The width of the flat portion corresponding to the groove less the tapered portion or the inclined portion is termed the groove width Wg. In FIG. 6, the protuberant portion looking from the light-transmitting layer 7 is termed a land 102, with the total width of the groove 101 and the land consecutive thereto being a track pitch 103.

Figure 7:
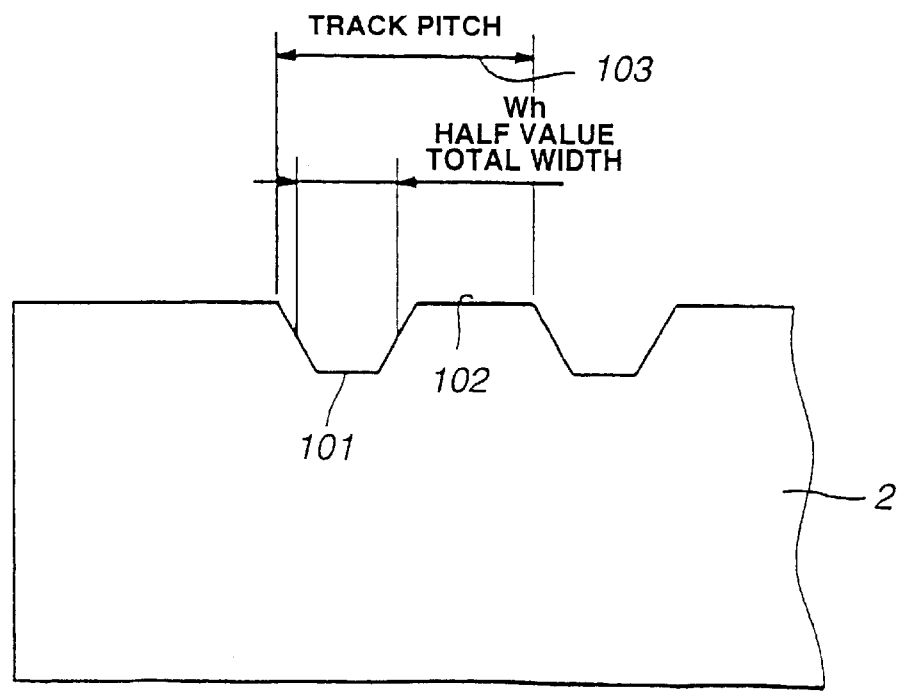
FIG. 7 shows the groove half-value total width Wh and a track pitch in a substrate.

Referring to FIG. 7, the width at the mid portions along the depth of the groove 101 is termed the half value total width Wh, with the (half value total width of the groove/track pitch 103)×100(%) is termed the groove duty.

If the reflective layer or the information recording layer, such as the phase-change type information recording layer, is formed, the groove duty of the guide groove formed in the recording type optical disc is changed, as in the case of the asymmetry of the above-described ROM disc. That is, if, looking from the light-transmitting layer 7, a desired ratio between the land 102 and the groove 101 is to be achieved at the information recording layer, the stamper needs to be manufactured taking changes in the groove duty into account.

That is, when recording in the groove 101, the groove width is decreased on forming the reflective film or the information recording layers, so that it is necessary to select the distance between the transcription grooves of the stamper to a broader value from the outset in forming the guide groove.

It has also been confirmed that, if signals are already recorded in both the land 102 and the groove 101, the cross-talk is affected to a lesser extent by cross-erasure if $\lambda(1+2m)/8$, where m is 0 or a natural number, is least and the depth between the and 102 and the groove 101 is deeper. Therefore, if ease in molding the substrate is taken into consideration, the depth of the groove 101 equal to $\lambda/8$ or $3\lambda/8$ is desirable in order to satisfy both characteristics.

If, for example, the information recording layers of the phase change type is already formed, signals are already recorded in both the land 102 and the groove 101, and if the land/groove duty of 50% is to be assured in this information recording layer, the groove duty needs to be set to the order of 58 to 65% or 65 to 75% on the substrate 2, looking from the light-transmitting layer 7, depending on the groove depth of $\lambda/8$ or $3\lambda/8$.

Figure 8:
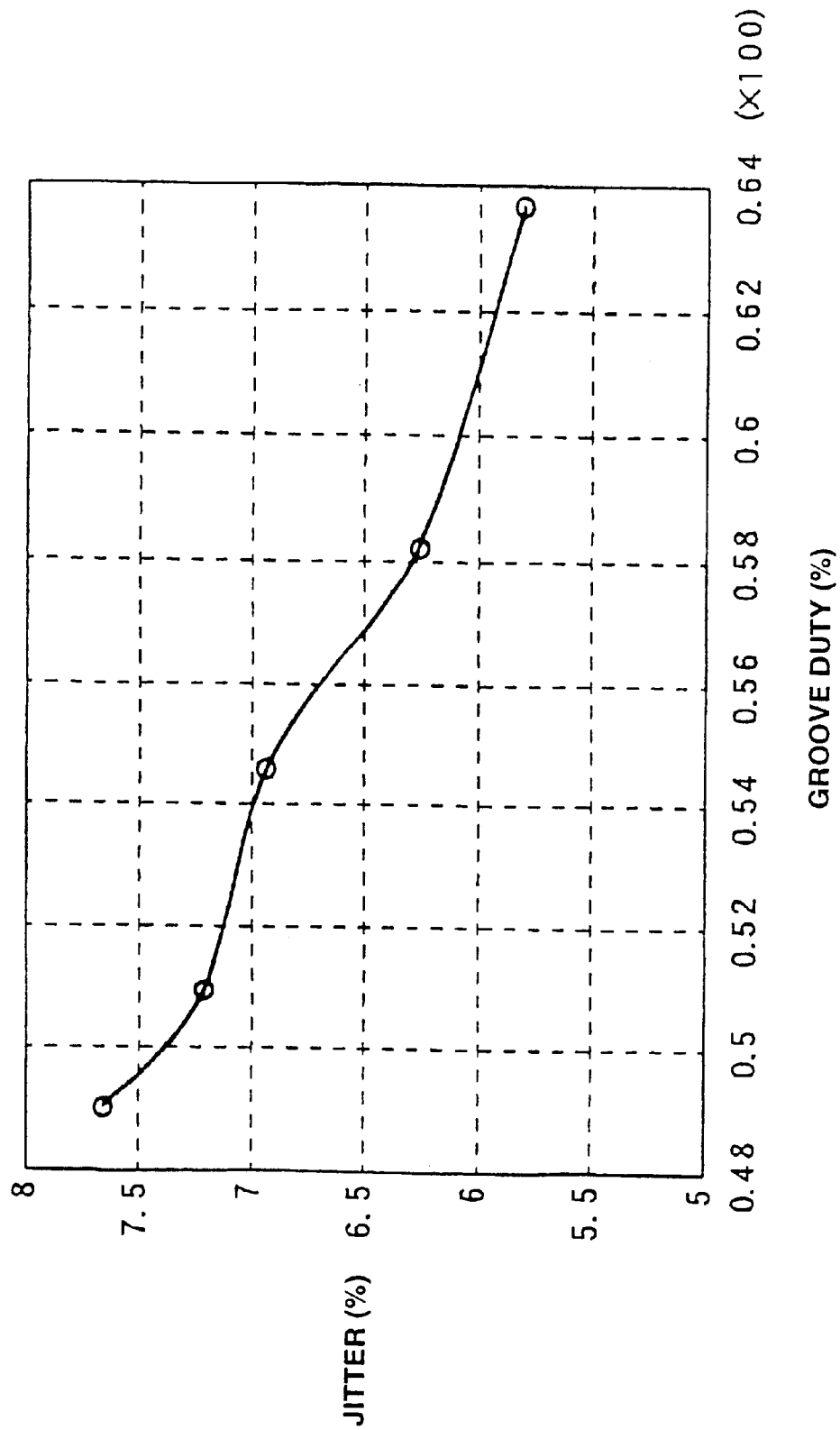
FIG. 8 shows a signal characteristic curve for groove recording.

FIG. 8 is a graph showing a signal characteristic curve in case recording is made in the groove in the multi-layered optical discs 1, 10 according to the present invention, specifically the relation between the groove duty and signal characteristics. FIG. 8, the abscissa and te ordinate denotes the groove duty and the jitter, respectively.

It is seen from FIG. 8 that jitter can be decreased for the groove duty of not less than 58%. On the other hand, if the groove duty exceeds 65%, interference between recording signals on neighboring tracks, or so-called cross-talk, is increased to deteriorate the sound quality. Thus, the groove duty of 58 to 65% may be said to be desirable.

Figure 9:
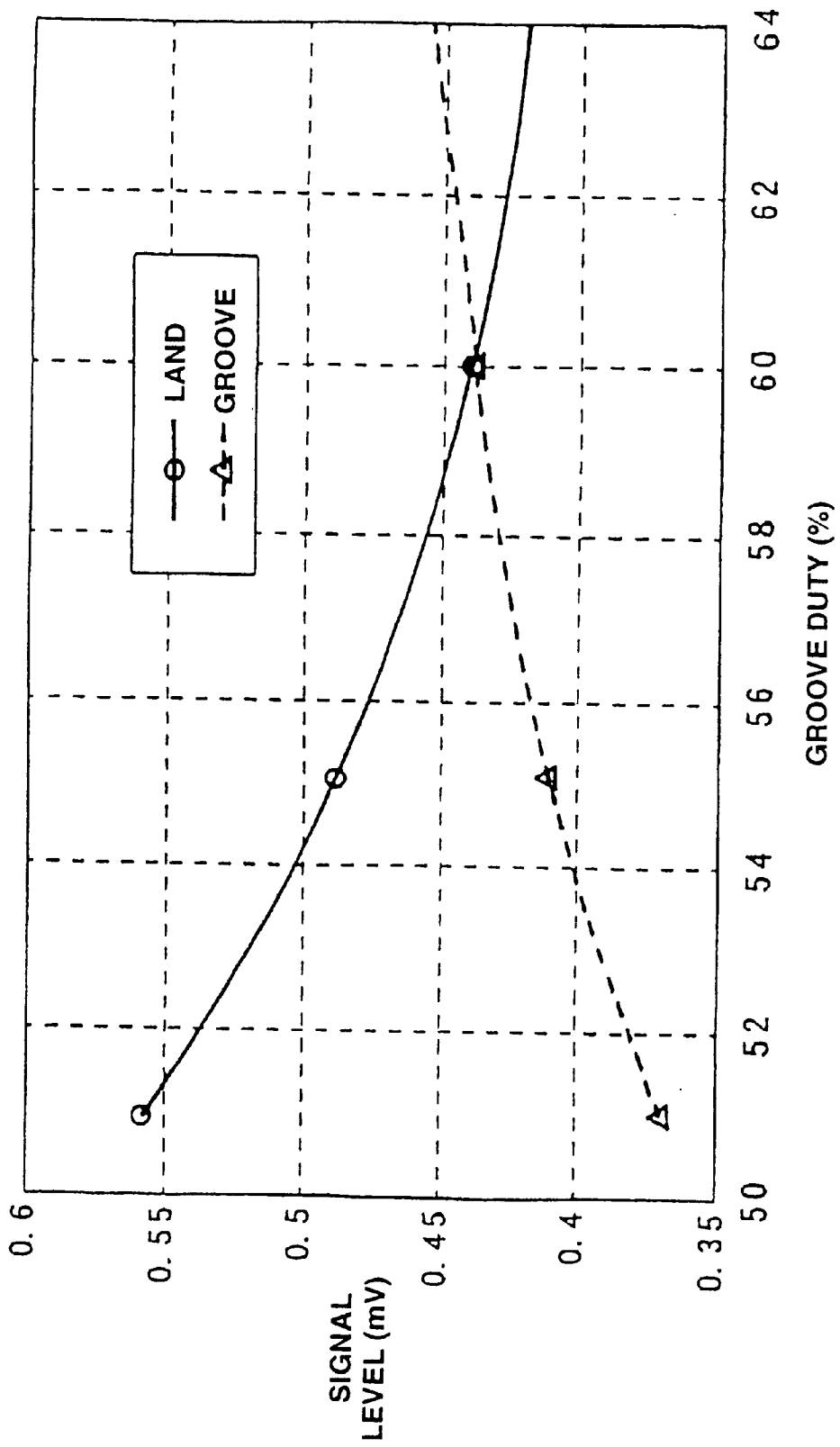
FIG. 9 shows the relation between the groove duty and signal characteristics.

FIG. 9 is a graph showing a signal characteristic curve in case recording is made both in the land 102 and in the groove 101 in the multi-layered optical discs 1, 10 according to the present invention, specifically the relation between the groove duty and signal level. FIG. 9, the abscissa and the ordinate denotes the groove duty and the signal level, respectively.

If the groove depth is set to $\lambda/8$, as shown in FIG. 9, the groove-land signal level balance is substantially in equilibrium for the groove duty of approximately 60%. It is also seen from FIG. 9 that the groove-land signal level balance is substantially in equilibrium in an optimum state for the groove duty of 58 to 65%.

If the molded substrate 2 is formed as a sole plate, it needs to be 0.3 to 1.2 magnetic material in thickness. In particular, in order to assure sufficient toughness, the thickness is desirably not less than 0.6 mm. If this substrate 2 is made up of two substrates, bonded together, the thickness of the substrate, in which the land and the groove as described above are formed, is desirably one-half the above thickness of 0.6 mm, that is 0,3 mm, or more.

If, after the injection molding of the substrate 2, the multi-layered optical disc according to the present invention is to be produced, the light reflecting layer 3, second information recording layer 4, transparent layer 5, first information recording layer 6 and the light-transmitting layer 7 are sequentially formed on this substrate 2.

In the conventional optical disc, the information recording layer, reflective layer, and the protective film are layered in this sequence on a transparent substrate, such that the layering sequence is reversed from that of the multi-layered optical disc according to the present invention.

On the guide groove of the substrate 2, having the above structure, the light reflecting layer 3 is formed by ion beam sputtering, to a film thickness of 50 to 200 nm, using a material mainly composed of Al and containing 0.4 to 0.8 wt % of Si, not more than 0.7 wt % of Fe, 0.15 to 0.40 wt % of Cu, not more than 0.15 wt % of Mn, 0.8 to 1.2 wt % of Mg, 0.04 to 0.35 wt % of Cr, not more than 0.25 wt % of Zn and not more than 0.15 wt % of Ti. This film-forming method by ion beam sputtering gives an optical disc having better signal characteristics than if the dc sputtering method, for example, is used.

On the light reflecting layer 3, thus formed, the first dielectric protective film 13, the film of the phase-change material 11, formed of GeSbTe, and the second dielectric protective film 14, formed of a mixture of a mixture of ZnS and $SiO_2$, are sequentially layered to form the second information recording layer 4. The film thickness is set so as to be within the range defined above.

The transparent layer 5 having a pattern of lands and grooves then is formed on the second information recording layer 4 by the photopolymer 2P method.

Then, as in the case of the second information recording layer 4, the first dielectric protective film 15, formed of a mixture of ZnS and $SiO_2$, the film of the phase-change material 12, formed of SbSe and the second dielectric protective film 16 formed of the mixture of ZnS and $SiO_2$, are sequentially formed on the transparent layer 5 to form the first information recording layer 6. The film thickness is set so as to be within the range described above.

Finally, an UV curable resin is formed by the spin coating method on the first information recording layer 6 to form the light-transmitting layer 7 to complete the multi-layered optical disc 10. The film thickness of the light-transmitting layer 7 is set so as to be within the range described above.

For forming the light-transmitting layer 7 by the spin coating method, the UV curable resin is supplied dropwise on the first information recording layer 6 and stretched on rotation, after which the UV rays are illuminated to form the light-transmitting layer 7. The UV curable resin preferably has the viscosity of 300 to 3000 cps.

Heretofore, if the UV curable resin is supplied dropwise on the film-forming material, the film-forming material is subjected to rotational stretching and UV rays are illuminated thereon to form the UV cured resin layer, the UV curable resin is supplied dropwise on one surface of the disc-shaped film-forming material having a radius of 25 mm for rotational stretching, there is produced the difference between the thickness on the inner rim and that on the outer rim, given the relation between the centrifugal force and the viscous resistance, with the difference between the thickness on the inner rim and that on the outer rim of the UV cured resin layer even reaching 30 μm or more.

For fabricating the light-transmitting layer 7 of the multi-layered optical disc 1 or 10 according to the present invention, the center opening of the substrate 2 carrying the information recording layers 4, 6 is temporarily stopped by stopping means to suppress the difference between the thickness on the inner rim and that on the outer rim of the UV cured resin layer. Specifically, a polycarbonate sheet 0.1 mm thickness is machined to a circular shape 30 mm in diameter and bonded to the center portion of the substrate 2 carrying the information recording layers 4, 6. The UV curable resin is then supplied dropwise and the substrate 2 is rotated for stretching. After illuminating the UV rays to cure the UV curable resin, the center opening is formed by punching to complete the light-transmitting layer 7 having the peak-to-peak difference between the thickness on the inner rim and that on the outer rim suppressed to less than 10 μm. Since the UV curable resin is likely to be exuded towards the outer rim of the substrate during formation of the light-transmitting layer 7, the inner diameter of the substrate 2 is preferably set to the maximum value of 120 mm+5 mm with the inner diameter of a CD of 120 mm as a reference.

It is also possible to bond a polycarbonate sheet 100 μm in thickness with a UV curable resin to from the light-transmitting layer. For example, if a polycarbonate sheet, machined to the same diameter as the substrate 2, is set via a UV curable resin for bonding on the first information recording layer 6 and stretched on rotation, after which the UV rays are illuminated, this sheet the operating as a weight for the UV curable resin to form an ultra-thin UV curable resin layer to permit the sheet to be bonded to the first information recording layer 6.

Figure 10:
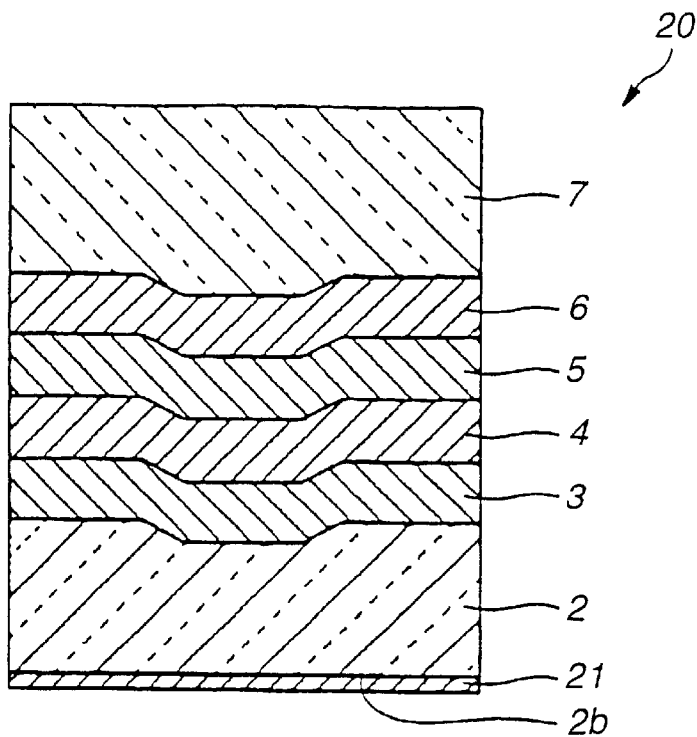
FIG. 10 is a cross-sectional view showing a further typical multi-layered optical disc embodying the present invention.
Figure 11:
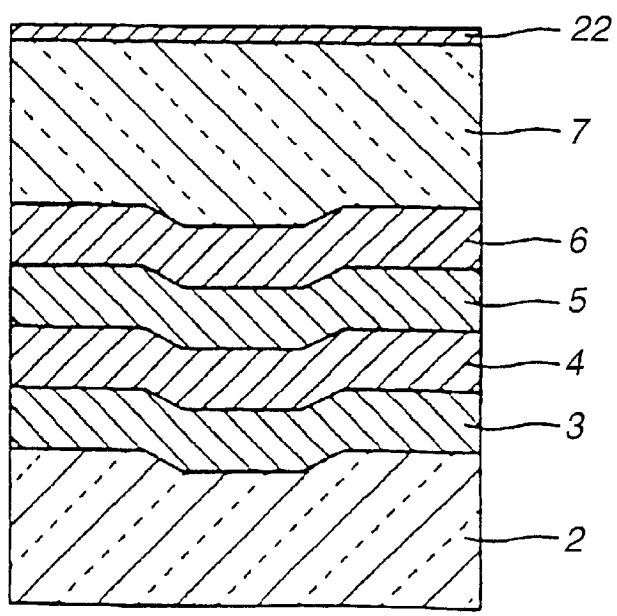
FIG. 11 is a cross-sectional view showing still another typical multi-layered optical disc embodying the present invention.

For forming a multi-layered optical disc 20 according to the present invention, a UV curable resin may be applied to the surface of the substrate 2 opposite to its surface carrying the light reflecting layer 3 or the information recording layers 4, 6 to form a protective layer 21, as shown in FIG. 10. With this protective layer 21, the disc skew can be suppressed to a minimum value. This protective layer 21 may be formed as in the case of forming the light-transmitting layer 7, using the same material, or may be formed to a thickness smaller than that of the light-transmitting layer 7, using UV curable resin having a higher curing contraction ratio than that of the UV curable resin as the starting material for the light-transmitting layer 7.

For recording/reproducing an optical disc that is able to cope with high density recording, such as the multi-layered optical discs 1, 10 or 20 embodying the present invention, it is necessary to use a pickup having an objective lens having a high NA. For recording/reproduction with this pickup, the distance between the objective lens and the optical disc is desirably set so as to be narrower than the conventional distance. However, in this case, it is likely that the objective lens collides against the optical disc surface to damage the disc surface.

If a hard coating layer 22 having a pencil hardness not lower than H is formed on the light-transmitting layer 7, it is possible to protect the information recording layers 4, 6 or the light-transmitting layer 7 sufficiently. Moreover, if the film thickness of the light-transmitting layer 7 is reduced, the effect of dust and dirt is apparent. Therefore, the hard coating layer 22 may be endowed with the electrification preventative function. This prevents deposition of dust and dirt on the optical disc surface.

Figure 12:
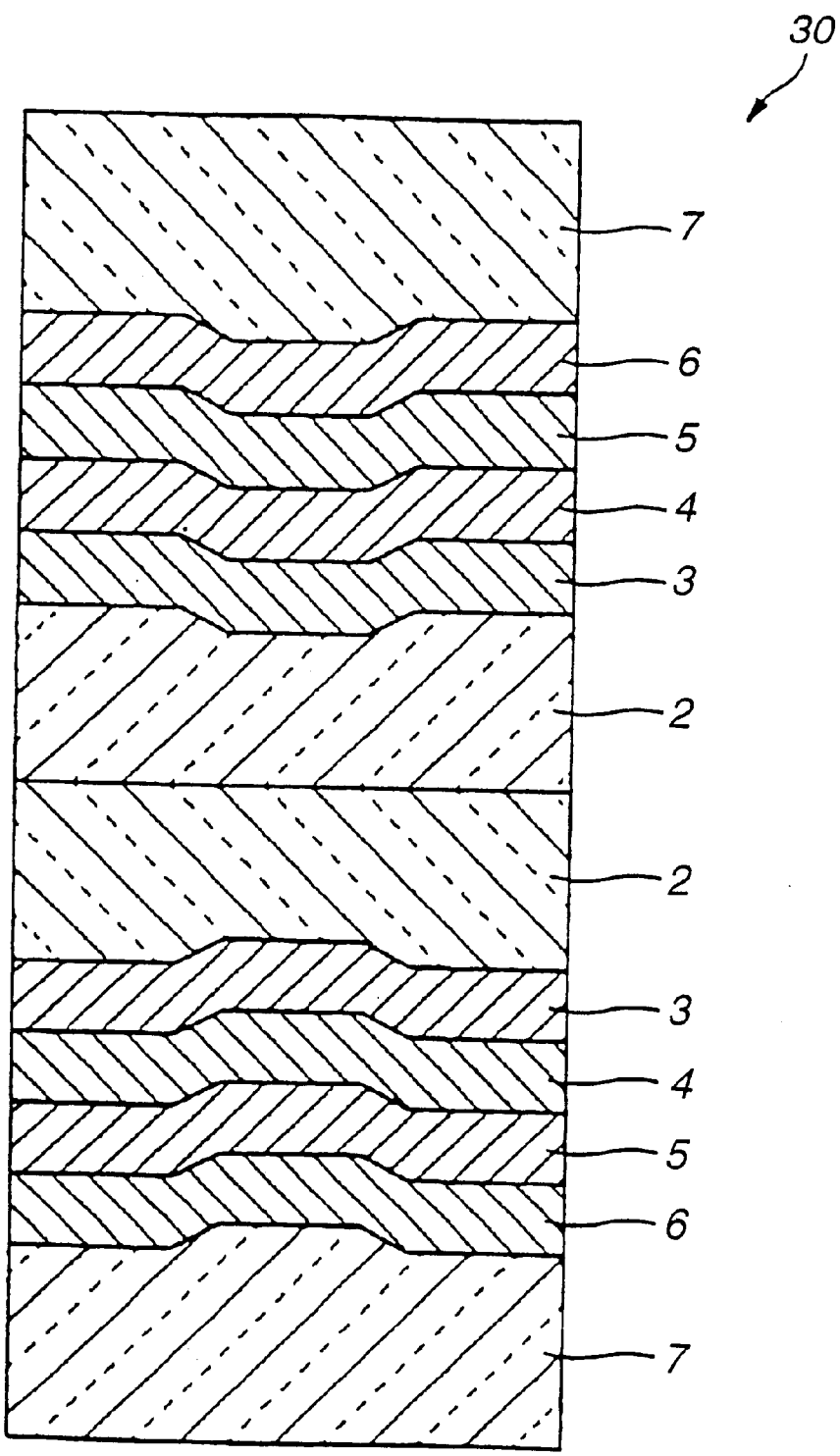
FIG. 12 is a cross-sectional view showing yet another typical multi-layered optical disc embodying the present invention.

FIG. 12 shows another multi-layered optical disc 30 according to the present invention in which two multi-layered optical discs 1 shown in FIG. 1 are bonded together. The multi-layered optical disc 30, thus obtained, can be recorded/reproduced from both sides, thus further improving the capacity.

Figure 13:
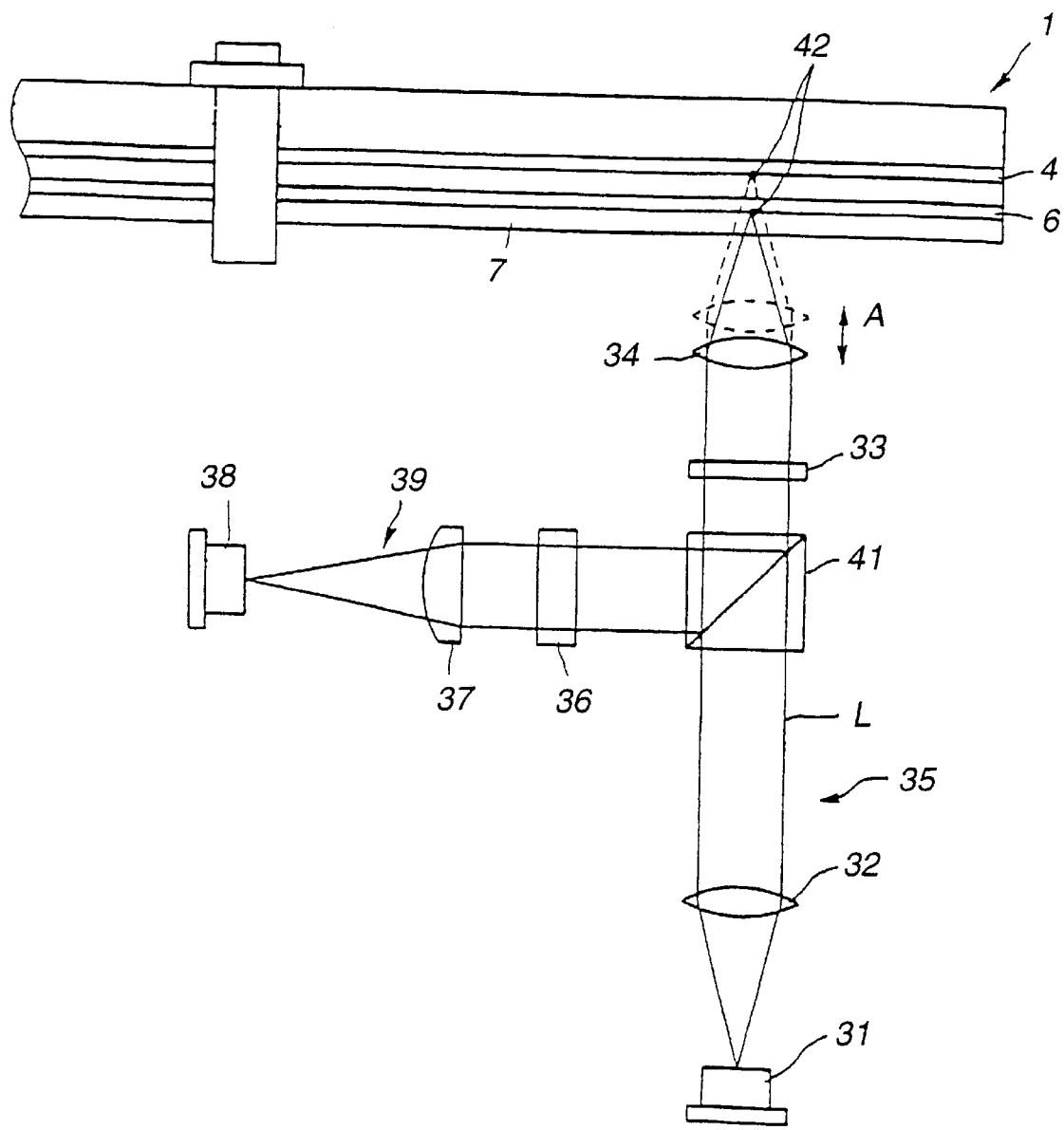
FIG. 13 shows a typical recording/reproducing apparatus embodying the present invention.

The information signals can be recorded or reproduced for the multi-layered optical discs 1, 10, by an optical system shown in FIG. 13.

This optical system is made up of an illuminating system 35, made up of a semiconductor laser 31, operating as a laser light source, a collimator lens 32, a quarter wave plate 33 and an objective lens 34, and a focussing servo system 39, made up of a converging lens 36, a cylindrical lens 37 and a photodiode 38. The optical disc 10, the optical properties of which are to be measured, is set on a turntable, with the light-transmitting layer 7 facing the objective lens 34 of the optical system.

In this optical system, the laser light L radiated from the semiconductor laser 31 is collimated by the collimator lens 32. The collimated light traverses a beam splitter 41, quarter wave plate 33 and the objective lens 34 to form a beam spot 42 on the disc surface. The reflected light from the disc surface again traverses the objective lens 34 and the quarter wave plate 33 to fall on the beam splitter 41. The light is then reflected by the focussing servo system 39 and received by a photodiode 38 via the light converging lens 36 and the cylindrical lens 37. The light intensity information is then transmitted to a biaxial device, not shown, adapted for moving the objective lens 34 in a controlled manner in the direction indicated by arrow A, so that the objective lens 34 is moved for converging the laser light on the information recording layers 4, 6 to be recorded or reproduced.

EXAMPLES

The present invention is ha explained with reference to several Examples based on experimental results.

Example 1

As a multi-layered optical disc embodying the present invention, a multi-layered optical disc 10 configured as shown in FIG. 5 was prepared.

This multi-layered optical disc 10 has a light reflecting layer 3, a second information recording layer 4, a transparent layer 5, a first information recording layer 6 and a light-transmitting layer 7, sequentially layered on the transparent substrate 2. This first information recording layer 6 is made up of a first dielectric protective film 15, a film of a phase-change material 12 and a second dielectric protective film 16. The second information recording layer 4 is made up of a first dielectric protective film 13, a film of a phase-change material 11 and a second dielectric protective film 14. With the present multi-layered optical disc 10, the first information recording layer 6 and the second information recording layer 4 are overwrite type recording layers. This multi-layered optical disc was prepared in the following manner:

First, the polycarbonate substrate 2, having grooves formed on the disc surface, was prepared.

On the surface of the polycarbonate substrate 2, having the grooves formed therein, the light reflecting layer 3 was formed by ion beam sputtering, to a film thickness of 150 nm, using a material mainly composed of Al and containing 0.4 to 0.8 wt % of Si, not more than 0.7 wt % of Fe, 0.15 to 0.40 wt % of Cu, not more than 0.15 wt % of Mn, 0.8 to 1.2 wt % of mg, 0.04 to 0.35 wt % of Cr, not more than 0.25 wt % of Zn and not more than 0.15 wt % of Ti.

On the light reflecting layer 3, thus formed, the first dielectric protective film 13, formed of a ZnS—SiO$_2$ mixture, the film of the phase-change material 11, formed of a Ge$_2$Sb$_2$Te$_5$ ternary alloy, and the second dielectric protective film 14, formed of a mixture of a mixture of ZnS and SiO$_2$, were sequentially layered to form the second information recording layer 4.

The film thicknesses of the second information recording layer 4 were as follows:
film thickness structure of the second information recording layer 4
  first dielectric protective film 13: 12 nm
  film of phase-change material 11: 22 nm
  second dielectric protective film 14: 130 nm
The optical constants for the wavelength 780 nm of the film of phase-change material 11 were as follows:
optical constants of the film of phase-change material 11 at the wavelength of 780 nm were as follows:
crystalline state:
  refractive index $nc_2$; 5.2
  extinction coefficient $kc_2$; 3.97
amorphous state:
  refractive index $na_2$; 4.4
  extinction coefficient $ka_2$; 1.45
  Therefore, $(nc_2/na_2)+(kc_2/ka_2)=3.9(\leq 4.0)$.

On the second information recording layer 4, thus formed, a transparent layer 5 having a pattern of lands and grooves was formed by the photopolymer (2P) method. The thickness of the transparent layer 5 was 100 μm.

On the light reflecting layer 5, thus formed, the first dielectric protective film 15, formed of a ZnS—SiO$_2$ mixture, the film of the phase-change material 12, formed of a Ge$_2$Sb$_2$ binary alloy, and the second dielectric protective film 16, formed of a mixture of ZnS and SiO$_2$, were sequentially layered to form the second information recording layer 4.

The film thicknesses of the first information recording layer 6 were as follows:
film thickness structure of the first information recording layer 6
  first dielectric protective film 15: 100 nm
  film of phase-change material 12: 20 nm
  second dielectric protective film 16: 130 nm
The optical constants for the wavelength 780 nm of the film of phase-change material 12 were as follows:
optical constants of the film of phase-change material 12 at the wavelength of 780 nm were as follows:
crystalline state:
  refractive index $nc_1$; 0.45
  extinction coefficient $kc_1$; 0.82
amorphous state:
  refractive index $na_1$; 3.96
  extinction coefficient $ka_1$; 0.38
  Therefore, $1/5(nc_1/na_1)+(kc_1/ka_1)=2.4(\leq 10)$, $nc_1/na_1+1/5(kc_1/ka_1)=1.6(\leq 10)$.

Finally, a UV curable resin was spin-coated on this first information recording layer 6 to form the light-transmitting layer 7 to complete the multi-layered optical disc.

With the multi-layered optical disc, thus produced, the films of phase-change material 11, 12 are formed in the amorphous state. Therefore, the laser light was illuminated on the entire surfaces of the films of phase-change material 11, 12 to produce the crystalline state (initialization). On the initialized films of phase-change material 11, 12, recording pits were formed, and optical properties of the portions carrying the recording pits and those not carrying the recording pits with respect to the laser light having the wavelength of 780 nm were checked. The recording pits were formed by condensing the laser light to raise the temperature of the films of phase-change material 11, 12 locally to higher than the melting point and by subsequently quenching the films to cause phase change of the material to the amorphous state. Therefore, the portions carrying the recording pits are those portions phase-changed to the amorphous state, while those not carrying the recording pits are those portions kept in the crystalline state.

The optical properties of the first information recording layer 6 and the second information recording layer 4, measured using the optical system shown in FIG. 13, are shown below. It is noted that the reflectance, light absorbency and light transmittance are those related to 100% intensity of light incident on the respective information recording layers. Thus, in the case of the second information recording layer 4, the intensity of light incident on the light-transmitting layer 7, transmitted through the first information recording layer 6 and subsequently incident on the second information recording layer 4, is set to 100%.
optical properties of the first information recording layer 6
crystalline portion:
  reflectance $Rc_1$; 12.2%
  light absorbency $Ac_1$; 25.2%
  light transmittance $Tc_1$; 62.6%
amorphous portion:
  reflectance $Ra_1$; 6.0%
  light absorbency $Aa_1$; 13.6%
  light transmittance $Ta_1$; 80.4%
optical properties of the second information recording layer 4
crystalline portion:
  reflectance $Rc_2$; 29.7%
  light absorbency $Ac_2$; 66.6%
amorphous portion:
  reflectance $Ra_2$; 5.7%
  light absorbency $Aa_2$; 78.6%

In the present multi-layered optical disc 10, since the high light absorbency is obtained in the first information recording layer 6, the light can be transmitted through the first information recording layer 6 to fall on the second information recording layer 4 with a sufficient intensity. In both the first information recording layer 6 and the second information recording layer 4, high reflectivity is achieved. By the high reflectance ratio between the crystalline portion and the amorphous portion, the recording pits can be detected correctly to realize optimum recording/reproducing characteristics.

In the present Example, both the first information recording layer 6 and the second information recording layer 4 are overwrite type recording layers. For the multi-layered optical disc having a similar layer structure, an overwrite recording layer an a write-once recording layer were used as the first information recording layer and as the second information recording layer. It was found that the same optical properties could be obtained as those in which both layers were overwrite recording layers to achieve optimum recording/reproducing characteristics.

Example 2

Figure 14:
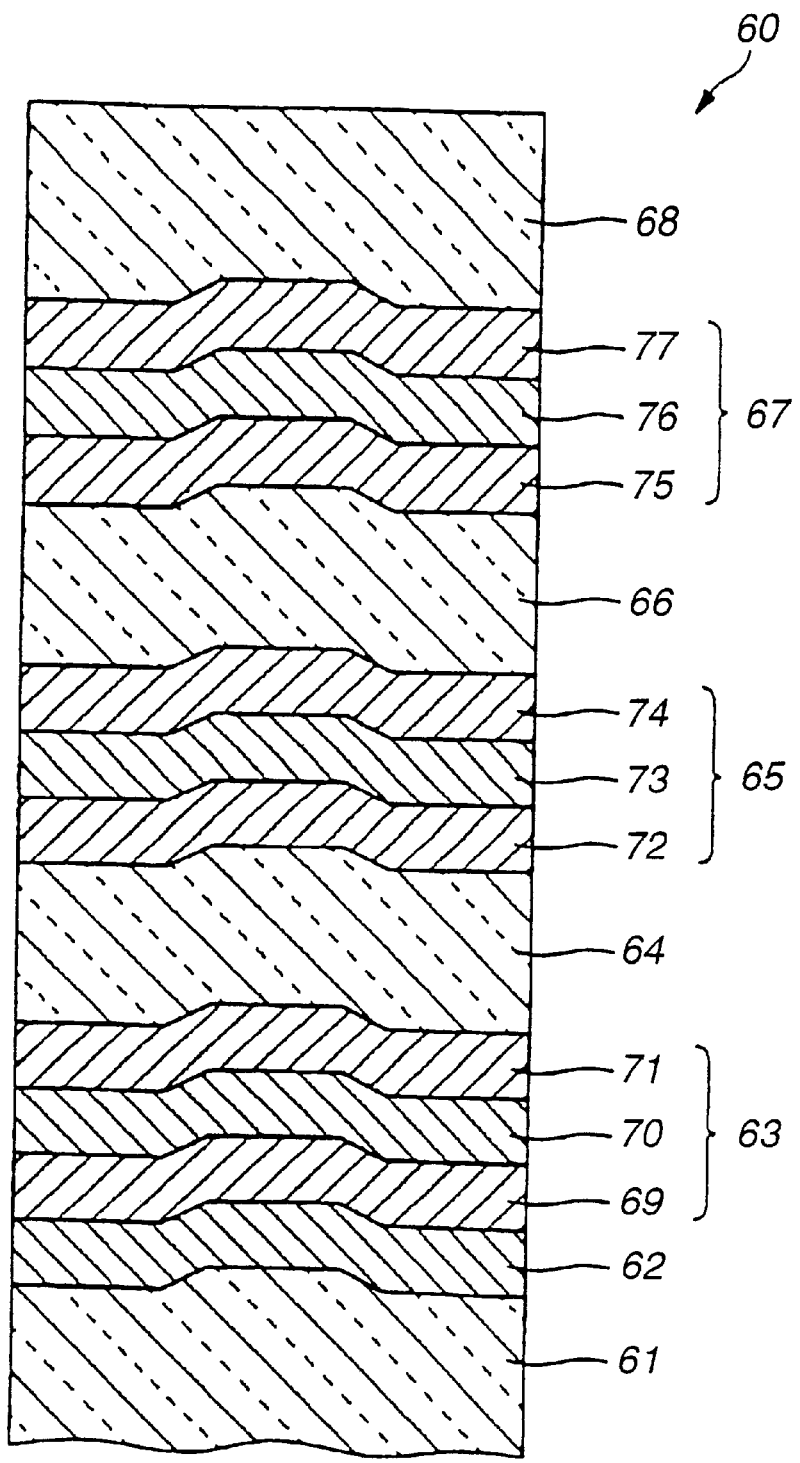
FIG. 14 shows another typical recording/reproducing apparatus embodying the present invention.

As a multi-layered optical disc embodying the present invention, a multi-layered optical disc 60 having three recording layers as shown in FIG. 14 was fabricated.

This multi-layered optical disc 60 includes a light reflecting layer 62, a third information recording layer 63, a transparent layer 64, a second information recording layer 65, a transparent layer 66, a first information recording layer 67 and a light-transmitting layer 68, sequentially formed on a substrate 61. The first information recording layer 67 is made up of a first dielectric protective film 75, a film of phase-change material 76 and a second dielectric protective film 77, while the second information recording layer 65 is made up of a first dielectric protective film 72, a film of phase-change material 73 and a second dielectric protective film 74. The third information recording layer 63 is made up of a first dielectric protective film 69, a film of phase-change material 70 and a second dielectric protective film 71.

In this multi-layered optical disc, information signals are recorded on the first information recording layer 67, second information recording layer 65 and the third information recording layer 63, formed as overwrite recording layers. This multi-layered optical disc was fabricated as follows:

First, a polycarbonate substrate 61, having grooves in its disc surface, the light reflecting layer 62, having a film thickness of 150 nm, was formed by an ion beam sputtering method, using a material similar to that of the light reflecting layer in Example 1.

On this light reflecting layer 62, the first dielectric protective film 69, formed of a ZnS—SiO$_2$ mixture, the film of phase-change material 70, formed of a Ge$_2$Sb$_2$Te$_5$ ternary alloy, and the second information recording layer 71, formed of a ZnS—SiO$_2$ mixture, were sequentially deposited and formed to form the third information recording layer 63.

The film thicknesses of the respective layers making up the third information recording layer 63 were as follows:
film thickness structure of the first information recording layer 63
first dielectric protective film 69: 30 nm
film of phase-change material 70: 24 nm
second information recording layer 71: 200 nm
The optical constants of the film of phase-change material 70 at a wavelength of 780 nm were as follows:
optical constants of the film of phase-change material (Ge$_2$Sb$_2$Te$_5$) of the third information recording layer 63
crystalline state:
  refractive index $nc_3$; 5.2
  extinction coefficient $kc_3$; 3.97
amorphous state:
  refractive index $na_3$; 4.4
  extinction coefficient $ka_3$; 1.45
  Therefore, $(nc_3/na_3)+(kc_3/ka_3)=3.9(\leq 4.0)$.
On the third information recording layer 63, thus formed, a transparent layer 64 having a pattern of lands and grooves was formed by the photopolymer (2P) method. The thickness of the transparent layer 64 was 100 μm.

On the transparent layer 64, thus formed, the first dielectric protective film 72, formed of a ZnS—SiO$_2$ mixture, the film of the phase-change material 73, formed of a Ge$_2$Sb$_2$ binary alloy, and the second dielectric protective film 74, formed of a mixture of ZnS and SiO$_2$, were sequentially layered to form the second information recording layer 65.

The film thicknesses of the respective layers making up the second information recording layer 65 are as follows:
film thickness structure of the second information recording layer 65
first dielectric protective film 72: 100 nm
film of phase-change material 73: 20 nm
second dielectric protective film 74: 130 nm
The optical constants of the film of phase-change material 73 at a wavelength of 780 nm are as follows:
optical constants of the second information recording layer 65 (Sb$_2$Se$_3$)
crystalline state:
  refractive index $nc_1$; 4.45
  extinction coefficient $kc_1$; 0.82
amorphous state:
  refractive index $na_1$; 3.96
  extinction coefficient $ka_1$; 0.38
  Therefore, $1/5(nc_1/na_1)+(kc_1/ka_1)=2.4(\leq 10)$, $nc_1/na_1+1/5(kc_1/ka_1)=1.6(\leq 10)$.

On this second information recording layer 65, a transparent layer 66 having a pattern of lands and grooves was formed by the photopolymer method to a thickness of 100 μm. Then, on this transparent layer 66, a first dielectric protective film 75, formed of a ZnS—SiO$_2$ mixture, a film of phase-change material 76, formed of a Sb$_2$Se$_3$ binary alloy and a second dielectric protective film 77 formed of a ZnS—SiO$_2$ mixture were sequentially deposited to form the first information recording layer 67.

The first information recording layer 67 was of the same material and the film thickness structure as those of the second information recording layer 65.

Finally, a UV curable resin was spin-coated on this first information recording layer 67 to form the light-transmitting layer 68 of a film thickness of 100 um to complete the multi-layered optical disc.

The multi-layered optical disc, thus produced, was initialized, using the same optical system as that used in Example 1. Then, recording pits were formed, and optical properties of a portion carrying the recording pits (amorphous portion) and a portion not carrying the recording pits (crystalline portion) with respect to the laser light having the wavelength of 780 nm were checked, the results are given below.

Meanwhile, the light reflectance, light absorbency and light transmittance are those based of the intensity of the light incident on the respective information recording layers. Thus, in the case of the third information recording layer 63 and the second information recording layer 65, the intensity of the light transmitted through the information recording layer lying closer to the light-transmitting layer 68 than the respective information recording layers to fall on the information recording layer in question is set to 100%.
optical properties of the first information recording layer 67
crystalline portion:
  reflectance $Rc_1$; 12.2%
  light absorbency $Ac_1$; 25.2%
  light transmittance $Tc_1$; 62.6% amorphous portion:

reflectance $Ra_1$; 6.0% light absorbency $Aa_1$; 13.6% light transmittance $Ta_1$; 80.4% optical properties of the second information recording layer 65 crystalline portion:

reflectance $Rc_2$; 12.2% light absorbency $Ac_2$; 25.2% light transmittance $Aa_2$; 62.6% amorphous portion:

reflectance $Ra_2$; 6.0% light absorbency $Aa_2$; 13.6% light transmittance $Ta_2$; 80.4% optical properties of the third information recording layer 63 crystalline portion:

reflectance $Rc_3$; 37.4% light absorbency $Ac_3$; 60.9% amorphous portion:

reflectance $Ra_3$; 13.0% light absorbency $Ta_3$; 78.8%

If, in this multi-layered optical disc 60, recording/reproduction is to be performed for the second information recording layer 63, the light from the light-transmitting layer 68 is transmitted through the first information recording layer 67 and the second information recording layer 65 to fall on the third information recording layer 63.

It is seen from the above results that, in the multi-layered optical disc 60, high light transmittance was obtained with the first information recording layer 67 and the second information recording layer 65 and that the light can be caused to fall on the second information recording layer 63 through these layers with a sufficient intensity. In any of the information recording layers, high light reflectance and a large crystalline portion/amorphous portion reflectance ratio can be achieved, whereby the recording pits can be detected correctly to achieve optimum recording/reproducing characteristics.

Example 3

A multi-layered optical disc 10 configured as shown in FIG. 5 was fabricated.

In this multi-layered optical disc 10, a light reflecting layer 3, a second information recording layer 4, a transparent layer 5, a first information recording layer 6 and a light-transmitting layer 7 are sequentially layered on a transparent substrate 2. This first information recording layer 6 is made up of a first dielectric protective film 15, a film of a phase-change material 12 and a second dielectric protective film 16. The second information recording layer 4 is made up of a first dielectric protective film 13, a film of a phase-change material 11 and a second dielectric protective film 14. With the present multi-layered optical disc 10, the first information recording layer 6 and the second information recording layer 4 are overwrite type recording layers. This multi-layered optical disc was prepared in the following manner:

First, a polycarbonate substrate 2, having grooves formed on the disc surface, was prepared.

On the surface of the polycarbonate substrate 2, having the grooves formed therein, the light reflecting layer 3 having the same film thickness structure as that of Example 1 was formed, using the material and the film-forming method as those of Example 1.

On the light reflecting layer 3, thus formed, the first dielectric protective film 13, formed of a ZnS—$SiO_2$ mixture, the film of the phase-change material 11, formed of a $Ge_2Sb_2Te_5$ ternary alloy, and the second dielectric protective film 14, formed of a mixture of a mixture of ZnS and $SiO_2$, were sequentially layered to form the second information recording layer 4.

The film thicknesses of the second information recording layer 4 were as follows:

film thickness structure of the second information recording layer 4 first dielectric protective film 13: 14 nm film of phase-change material 11: 18 nm second dielectric protective film 14: 130 nm The optical constants for the wavelength 780 nm of the film of phase-change material 11 were as follows:

optical constants of the film of phase-change material 11 ($Ge_2Sb_2Te_5$) at the wavelength of 780 nm were as follows:

crystalline state:

refractive index $nc_2$; 5.2 extinction coefficient $kc_2$; 3.97 amorphous state:

refractive index $na_2$; 4.4 extinction coefficient $ka_2$; 1.45

Therefore, $(nc_2/na_2)+(kc_2/ka_2)=3.9(\leq 4.0)$.

On the second information recording layer 4, thus formed, a transparent layer 5 having a pattern of lands and grooves was formed by the photopolymer (2P) method. The thickness of the transparent layer 5 was 100 μm.

On the light reflecting layer 5, thus formed, the first dielectric protective film 15, formed of a ZnS—$SiO_2$ mixture, the film of the phase-change material 12, formed of a $Ge_2Sb_2$ binary alloy, and the second dielectric protective film 16, formed of a mixture of ZnS and $SiO_2$, were sequentially layered to form the first information recording layer 6.

The film thicknesses of the first information recording layer 6 were as follows:

film thickness structure of the first information recording layer 6 first dielectric protective film 15: 160 nm film of phase-change material 12: 20 nm second dielectric protective film 16: 110 nm The optical constants for the wavelength 780 nm of the film of phase-change material 12 were as follows:

optical constants of the film of phase-change material ($Ge_2Sb_2Te_5$)

crystalline state:

refractive index $nc_1$; 5.2 extinction coefficient $kc_1$; 3.97 amorphous state:

refractive index $na_1$; 4.4 extinction coefficient $ka_1$; 1.45

Therefore, $1/5(nc_1/na_1)+(kc_1/ka_1)=3.0(\leq 10)$, $nc_1/na_1+1/5(kc_1/ka_1)=1.7(\leq 10)$.

Finally, a UV curable resin was spin-coated on this first information recording layer 6 to form the light-transmitting layer 7 with a film thickness of 100 μm to complete the multi-layered optical disc.

With the multi-layered optical disc, thus produced, the films of phase-change material are formed in the amorphous state. Therefore, the laser light was illuminated on the entire surfaces of the films of phase-change material to produce the crystalline state (initialization). On the initialized films of phase-change material 11, 12, recording pits were formed, and optical properties of the portions carrying the recording pits and those not carrying the recording pits with respect to the laser light having the wavelength of 780 nm were checked in the same manner as in Example 1.

The optical properties of the first information recording layer and the second information recording layer, measured using the optical system shown in FIG. 13, are shown below. It is noted that the reflectance, light absorbency and light transmittance are those related to 100% intensity of light incident on the respective information recording layers. Thus, in the case of the second information recording layer 4, the intensity of light incident on the light-transmitting layer 7, transmitted through the first information recording layer 6 and subsequently incident on the second information recording layer 4, is set to 100%.

optical properties of the first information recording layer 6 crystalline portion:

reflectance $Rc_1$; 26.5% light absorbency $Ac_1$; 59.3% light transmittance $Tc_1$; 14.0% amorphous portion:

reflectance $Ra_1$; 6.7% light absorbency $Aa_1$; 50.0% light transmittance $Ta_1$; 42.4% optical properties of the second information recording layer 4 crystalline portion:

reflectance $Rc_2$; 26.4% light absorbency $Ac_2$; 68.9% amorphous portion:

reflectance $Ra_2$; 10.6% light absorbency $Aa_2$; 72.4%

If, in this multi-layered optical disc, the second information recording layer 4 is to be recorded or reproduced, the light from the light-transmitting layer 7 is transmitted through the first information recording layer 6 to fall on the second information recording layer 4.

It is seen from the above results that, with this multi-layered optical disc, the light transmittance in the crystalline portion of the first information recording layer 6 is low so that the light cannot be caused to fall on the second information recording layer 4 with sufficient intensify. Moreover, the light reflectance on the second information recording layer 4 is low such that sufficient amplitude of the playback signal cannot be obtained from the second information recording layer 4.

The results of our other experiments on multi-layered optical discs produced for trial demonstrated that, for obtaining sufficient signal amplitude from the second information recording layer 4, it is necessary for the light transmittance of both the crystalline and amorphous portions of the first information recording layer 6 to be not lower than 20%, and preferably not less than 40% and for the light reflectance of the first information recording layer 6 to be not less than 20% and preferably not less than 30%.

What is claimed is:

1. A multi-layered optical disc in which a recording section comprises:

two or more information recording layers with a transparent layer sandwiched therebetween; the recording section provided on a substrate having a thickness of 0.3 to 1.2 mm, and in which a light-transmitting layer having a thickness of 10 to 177 μm is formed on said recording section, with light being illuminated from a side of the light-transmitting layer to record and/or reproduce information signals, wherein the improvement resides in that at least one of the two or more information recording layers other than the information recording layer remotest from said light-transmitting layer has a phase-change material as a recording material.

2. The multi-layered optical disc according to claim 1 wherein the first information recording layer as counted from the light-transmitting layer has the phase-change material as a recording material.

3. The multi-layered optical disc according to claim 1 wherein the information recording layer remotest from the light-transmitting layer has the phase-change material as the recording material.

4. The multi-layered optical disc according to claim 1 wherein the information recording layer having the phase-change material as the recording material records the information signals thereon by the phase change of the phase-change material between a crystalline state and an amorphous state.

5. The multi-layered optical disc according to claim 1 wherein said phase-change material includes at least one of Au, Al, Ag, Bi, Cu, Cr, Co, Cd, Ce, Cs, Dy, Fe, Ge, Gd, Ga, Hf, In, K, La, Li, Mn, Mo, Ni, Nb, Nd, Na, Os, Pd, Pr, Pb, Ru, Rh, Rb, Sn, Sb, Si, Sm, Sc, Se, Te, Ti, Tb, Ta, Ti, V, W, Y, Zn and Zr.

6. The multi-layered optical disc according to claim 5 wherein said phase-change material includes InSe-based chalcogenides, SbSe-based chalcogenides, InSbSe-based chalcogenides, GeSbTe-based chalcogenides, GeSbTeSe-based chalcogenides, AgInSbTe-based chalcogenides, AgInSbSeTe-based chalcogenides GeSbTeN-based chalcogenides and AgInSbTeN-based chalcogenides.

7. The multi-layered optical disc according to claim 1 wherein said recording section is constituted by two information recording layers each having a phase-change material as a recording material.

8. The multi-layered optical disc according to claim 7 wherein the phase-change material constituting the phase-change material making up the first information recording layer as counted from the light-transmitting layer has the light reflectance in the crystalline state of not less than 10% and the light transmittance in the crystalline state and in the amorphous state of not less than 20%.

9. The multi-layered optical disc according to claim 7 wherein the phase-change material constituting the phase-change material making up the second information recording layer as counted from the light-transmitting layer has the light reflectance in the crystalline state of not less than 20% and the light absorbency in the crystalline state and in the amorphous state of not less than 60%.

10. A recording/reproducing apparatus comprising:

light radiating means for radiating light to a multi-layered optical disc having two or more information recording layers;

light condensing means for condensing the light radiated from said light radiating means on the multi-layered optical disc; and light receiving means for receiving the return light reflected from the multi-layered optical disc;

said multi-layered optical disc being such a disc in which a recording section is formed by layering two or more information recording layers via a transparent layer on a substrate, and in which a light-transmitting layer is formed on said recording section;

said light condensing section being movable in a controlled state so that the light from said light radiating means is focussed on each of the information recording layers on the multi-layered optical disc, whereby the light from the light radiating means is caused to fall on the respective information recording layers to record and/or reproduce information signals independently.

11. The recording/reproducing apparatus according to claim 10 wherein said multi-layered optical disc is such a disc in which said recording section is formed on a substrate having a thickness of 0.3 to 1.2 mm and in which a light-transmitting layer having a thickness of 10 to 177 µm is formed on said recording section; wherein at least one of the two or more information recording layers except the information recording layer remotest from said light-transmitting layer has a phase-change material as a recording material.

\* \* \* \* \*